United States Patent
Bujold et al.

(10) Patent No.: US 10,539,214 B2
(45) Date of Patent: Jan. 21, 2020

(54) POWER TRANSFER ASSEMBLIES FOR MOTOR VEHICLE DRIVELINES HAVING INTEGRATED TWO-PIECE PINION SHAFT AND COUPLING UNIT

(71) Applicant: Magna Powertrain of America, Inc., Troy, MI (US)

(72) Inventors: Michael P. Bujold, Royal Oak, MI (US); Brad Ketchel, Oxford, MI (US); Wade Smith, Metamora, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 51 days.

(21) Appl. No.: 15/659,723

(22) Filed: Jul. 26, 2017

(65) Prior Publication Data

US 2017/0321788 A1   Nov. 9, 2017

Related U.S. Application Data

(63) Continuation of application No. 15/089,906, filed on Apr. 4, 2016, now Pat. No. 9,739,360.

(60) Provisional application No. 62/145,327, filed on Apr. 9, 2015.

(51) Int. Cl.
  *F16H 48/08* (2006.01)
  *F16H 1/14* (2006.01)
  *F16H 48/38* (2012.01)

(52) U.S. Cl.
  CPC ............. *F16H 48/08* (2013.01); *F16H 1/145* (2013.01); *F16H 48/38* (2013.01)

(58) Field of Classification Search
  CPC .......... F16H 48/08; F16H 1/145; F16H 48/38; B60K 17/165; B60K 17/04
  See application file for complete search history.

(56) References Cited

U.S. PATENT DOCUMENTS

| 5,560,687 A | * | 10/1996 | Hagelthorn | B60B 27/001 301/105.1 |
|---|---|---|---|---|
| 6,544,140 B2 | | 4/2003 | Gradu et al. | |
| 9,739,360 B2 | * | 8/2017 | Bujold | F16H 48/08 |

(Continued)

FOREIGN PATENT DOCUMENTS

| CN | 201330829 Y | 10/2009 |
|---|---|---|
| CN | 204161111 U | 2/2015 |
| CN | 204164314 U | 2/2015 |

(Continued)

OTHER PUBLICATIONS

Search Report dated Jun. 21, 2019 from corresponding Chinese patent application No. 201610222086.1.

*Primary Examiner* — Ryan J. Walters
(74) *Attorney, Agent, or Firm* — Dickinson Wright PLLC

(57) ABSTRACT

An integrated pinion, bearing and coupling (PBC) assembly for use with a hypoid gearset in power transfer assemblies of motor vehicles. The PBC assembly includes a pinion unit having a pinion gear segment and a pinion stub shaft segment, and a coupler unit having a coupling flange segment and a coupler shaft segment. The pinion stub shaft segment surrounds and is in press fit engagement with the coupler shaft segment. A portion of the coupler shaft segment is deformed to be retained within one of a receiver groove and raised projections formed in the pinion stub shaft segment so as to fixedly secure the coupler unit to the pinion unit.

19 Claims, 16 Drawing Sheets

(56) References Cited

U.S. PATENT DOCUMENTS

2002/0183156 A1   12/2002   Gradu et al.

FOREIGN PATENT DOCUMENTS

| CN | 105378316 A | 3/2016 |
|---|---|---|
| WO | WO2013043202 A1 | 3/2013 |

* cited by examiner

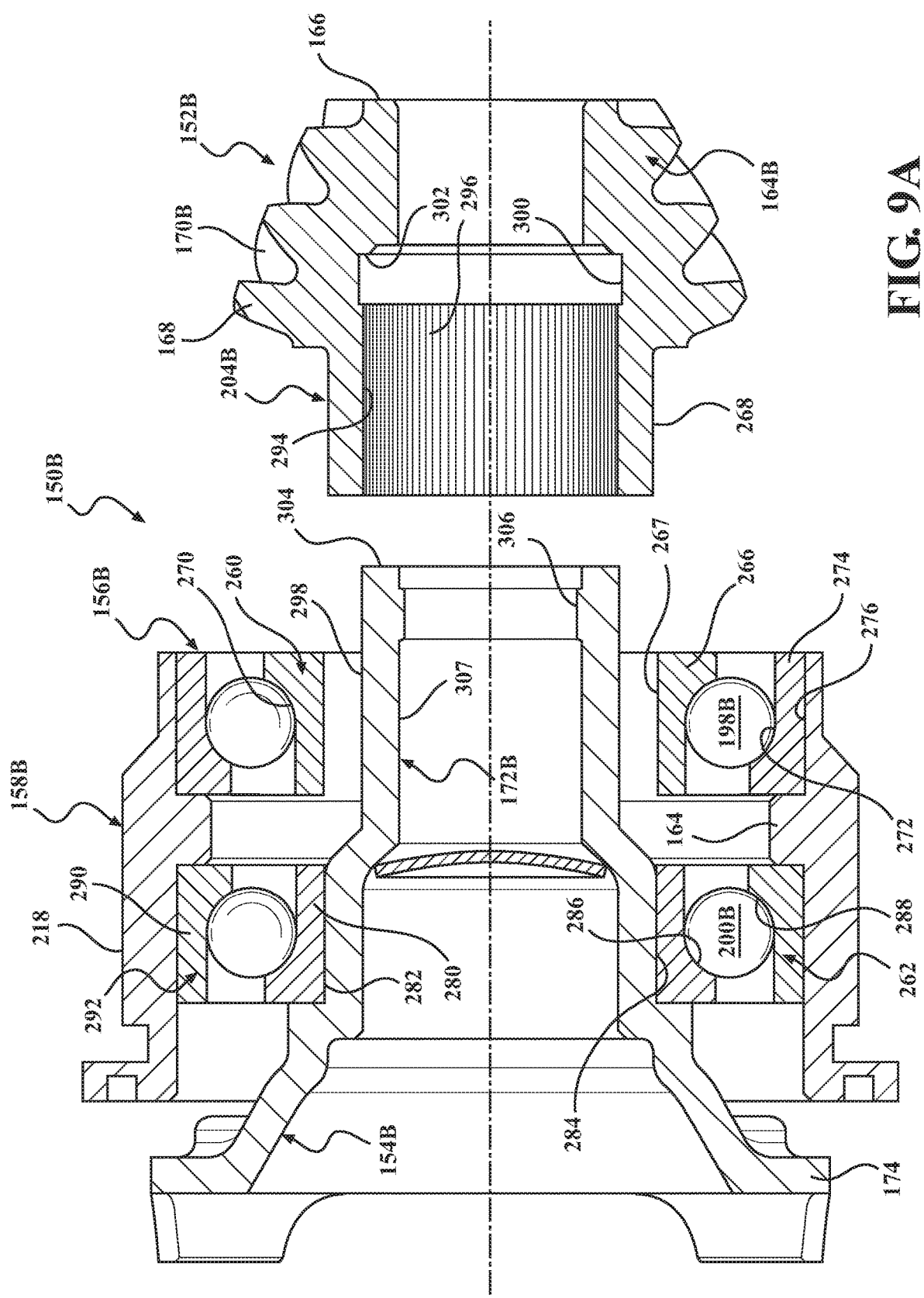

POWER TRANSFER ASSEMBLIES FOR MOTOR VEHICLE DRIVELINES HAVING INTEGRATED TWO-PIECE PINION SHAFT AND COUPLING UNIT

CROSS-REFERENCE TO RELATED APPLICATIONS

This application is a continuation of U.S. patent application Ser. No. 15/089,906 filed Apr. 4, 2016 which claims priority to U.S. Provisional Application No. 62/145,327 filed Apr. 9, 2015. The entire disclosures of the above applications are incorporated herein by reference.

FIELD

The present disclosure relates generally to power transfer systems for controlling the distribution of drive torque from a powertrain to front and rear drivelines of four-wheel drive (4WD) and all-wheel drive (AWD) motor vehicles. More particularly, the present disclosure is directed to an integrated pinion-bearing-coupling (PBC) assembly for hypoid gearsets of the type used in driveline applications for such motor vehicles.

BACKGROUND

This section provides background information related to the present disclosure which is not necessarily prior art.

In view of consumer demand for 4WD and AWD motor vehicles, a large number of power transfer systems are currently utilized in vehicular applications for selectively and/or automatically transmitting rotary power (i.e., drive torque) from the powertrain to all four wheels. In most power transfer systems, a power transfer assembly is used to deliver drive torque from the powertrain to one or both of the primary and secondary drivelines. The power transfer assembly is typically equipped with a torque transfer clutch that can be selectively actuated to shift operation of the power transfer system between a two-wheel drive mode and a four-wheel drive mode. In the two-wheel drive mode, drive torque is only transmitted to the primary driveline while drive torque can be transmitted to both of the primary and secondary drivelines when the vehicle is operating in the four-wheel drive mode.

In most 4WD vehicles, the power transfer assembly is a transfer case configured to normally transmit drive torque to the rear driveline and to selectively/automatically transfer drive torque through the torque transfer clutch to the front driveline. In contrast, in most AWD vehicles, the power transfer assembly is a power take-off unit (PTU) configured to normally transmit drive torque to the front driveline and to selectively/automatically transfer drive torque through the torque transfer clutch to the rear driveline.

Many power transfer assemblies are equipped with an adaptively-controlled torque transfer clutch to provide an "on-demand" power transfer system operable for automatically biasing the torque distribution ratio between the primary and secondary drivelines, without any input or action on the part of the vehicle operator, when traction is lost at the primary wheels. Modernly, such adaptively-controlled torque transfer clutches are configured to include a multi-plate friction clutch and a power-operated clutch actuator that is interactively associated with an electronic traction control system having a controller and a plurality of vehicle sensors. During normal operation, the friction clutch can be maintained in a released condition such that the power transfer assembly only transmits drive torque from the powertrain to the primary wheels for establishing the two-wheel drive mode. However, upon detection of conditions indicative of a low traction condition, the power-operated clutch actuator is actuated to engage the friction clutch and deliver a portion of the total drive torque to the secondary wheels, thereby establishing the four-wheel drive mode.

In virtually all power transfer systems of the types noted above, the secondary driveline is configured to include a propshaft and a drive axle assembly. The propshaft is drivingly interconnected between an output of the torque transfer clutch and an input to the drive axle assembly. Typically, a hypoid gearset is used to transmit drive torque from the propshaft to a differential gear mechanism associated with the drive axle assembly. The differential gear mechanism may include a differential carrier rotatably supported in a differential housing portion of an axle housing and which drives at least one pair of bevel pinions which, in turn, are commonly meshed with first and second output bevel gears that are connected to corresponding first and second axleshafts for driving the secondary wheels. The hypoid gearset typically includes a ring gear and a pinion gear meshed with the ring gear. The pinion gear is formed integrally with, or fixed to, a pinion shaft that is rotatably support by a cartridge-type bearing unit in a pinion housing portion of the axle housing. The pinion shaft is typically connected via a shaft coupling component of a coupling device, such as a universal joint, to the propshaft. The ring gear is typically fixed for rotation with the differential carrier. Due to the axial thrust loads transmitted through the hypoid gearset, it is common for the bearing unit to include at least two laterally-spaced bearing assemblies to support the pinion shaft for rotation relative to the pinion housing portion of the axle housing. Conventional arrangements for rotatably mounting the pinion shaft in the drive axle assembly are shown in U.S. Pat. No. 6,544,140 and International Publication No. WO2013/043202.

While such conventional pinion shaft and coupling support arrangements are adequate for their intended purpose, a need still exists to advance the technology and structure of such products to provide enhanced configurations that provide improved efficiency, reduced weight, and reduced packaging requirements.

SUMMARY

This section provides a general summary of the disclosure and is not to be interpreted as a complete and comprehensive listing of all of the objects, aspects, features and advantages associated with the present disclosure.

It is an aspect of the present disclosure to provide a power transfer assembly for use in motor vehicles and which is equipped with a hypoid gearset having an integrated pinion-bearing-coupling (PBC) assembly.

It is a related aspect of the present disclosure to provide an integrated PBC assembly for use with the hypoid gearset installed in one of a power take-off unit and a drive axle assembly and which is configured to be connected to a propshaft.

It is another related aspect of the present disclosure to provide an integrated PBC assembly having a pinion head secured to a tubular shaft segment of a coupler, a lock collar adapted to be fixedly installed in a pinion portion of a housing, and a bearing unit disposed between the lock collar and both the pinion head and the shaft segment of the coupler.

It is another aspect of the present disclosure to provide a method for fixedly securing the pinion head to the shaft segment of the coupler by deforming a portion of the shaft segment into engagement with a portion of the pinion head. In one arrangement, the deformed portion of the shaft segment is an annular rim flange configured to be deformed radially outwardly into a receiver groove formed in the pinion head. In another arrangement, the annular rim flange on the shaft segment is deformed radially outwardly into engagement with radially-inwardly extending surface projections formed on the pinion head.

It is another aspect of the present disclosure to utilize a similar method for fixedly securing a rotary component to a tubular shaft segment of a shaft. In one arrangement, the rotary component is a coupler flange configured to be secured to an end portion of the tubular shaft segment of a pinion shaft. In another arrangement, the rotary component is a drive gear or sprocket configured to be fixedly secured to the tubular shaft segment of an output shaft.

In accordance with these and other aspects, objectives and features of the present disclosure, a power transfer assembly is disclosed for use in a motor vehicle to include a rotary input driven by a powertrain of the motor vehicle, a rotary output driving an output device arranged to transmit drive torque to a pair of wheels, and a hypoid gearset having a ring gear and an integrated pinion-bearing-coupling (PBC) assembly. The ring gear is drivingly connected to one of the rotary input and the rotary output. The PBC assembly is drivingly connected to the other one of the rotary input and rotary output. The PBC assembly is configured to include a pinion head having a pinion gear segment with teeth adapted to mesh with teeth on the ring gear and a tubular pinion stub shaft segment, a coupler having a tubular coupler shaft segment and a coupler flange segment, a lock collar, and a bearing unit disposed between the lock collar and pinion stub shaft segment of the pinion head and the coupler shaft segment of the coupler. The pinion stub shaft segment of the pinion head surrounds and is in press-fit engagement with the coupler shaft segment of the coupler. A metal deformation process is employed to upset a ring of material associated with the tubular coupler shaft segment of the coupler into engagement with at least one of a receiver groove and raised surface projections formed in the pinion stub shaft segment of the pinion head.

Further areas of applicability will become apparent from the detailed description provided herein. The specific embodiments and examples set forth in this summary are intended for purposes of illustration only and are not intended to limit the scope of the present disclosure.

DRAWINGS

The drawings described herein are provided for illustrative purposes only of selected embodiments and are not intended to limit the scope of the present disclosure. According to the following:

FIG. 9A through 9D illustrate a method for assembling an integrated PBC assembly which is constructed in accordance with a third embodiment of the present disclosure;

Figure 11A:
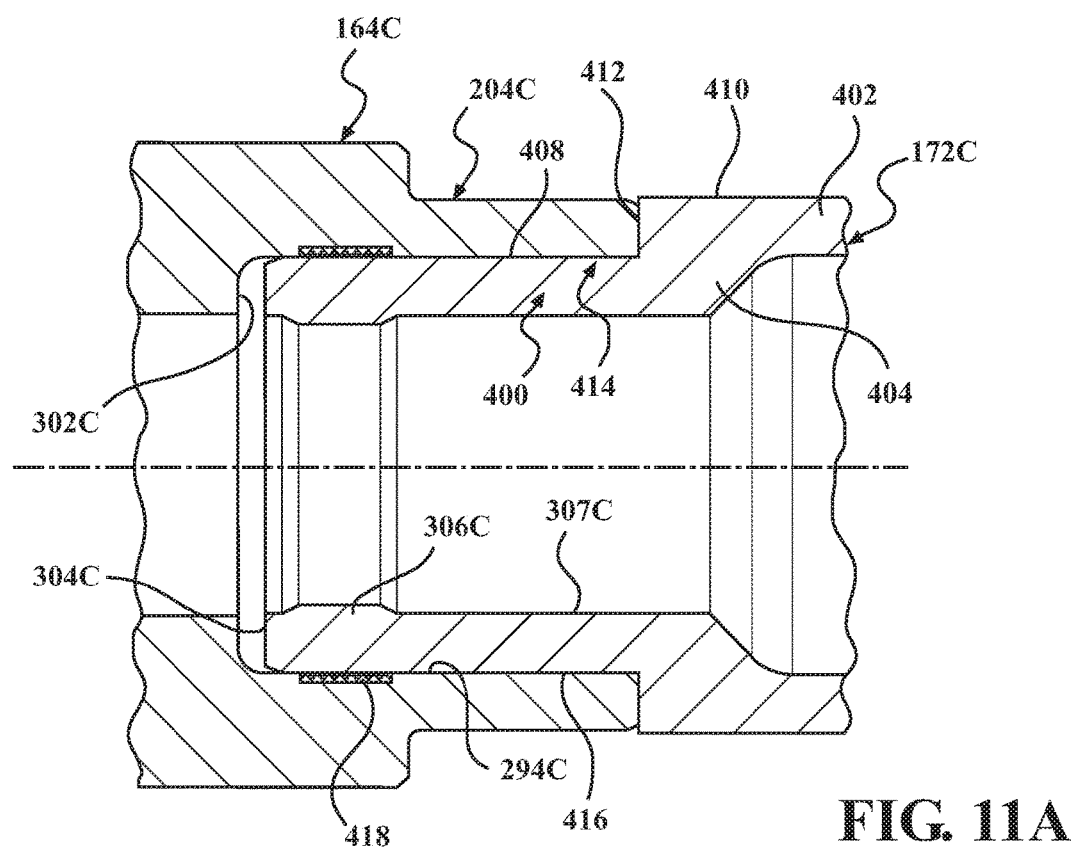
FIGS. 11A through 11C illustrate a method for securing the pinion and coupling components of the integrated PBC assemblies utilizing the teachings of the present disclosure.
Figure 11B:
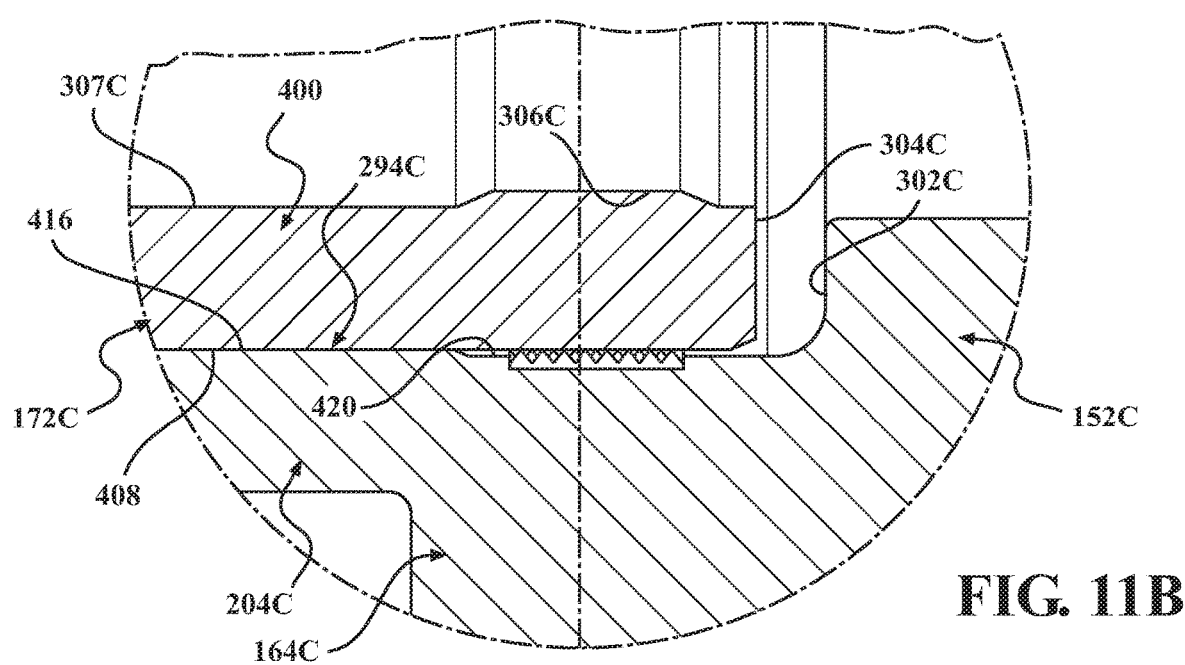
Figure 11C:
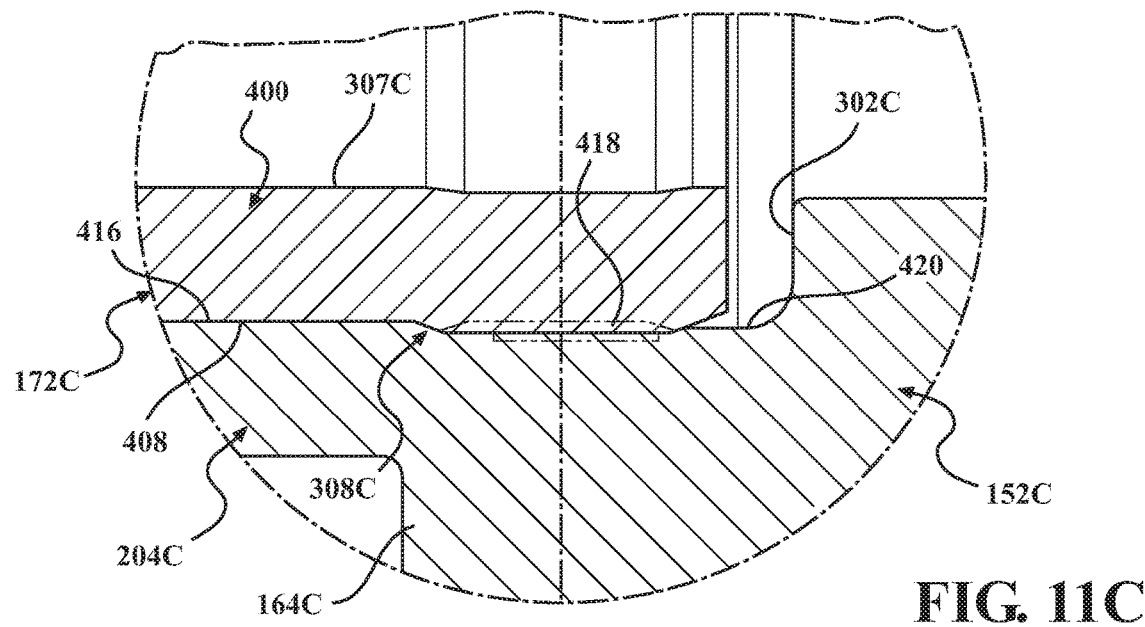
Figure 13A:
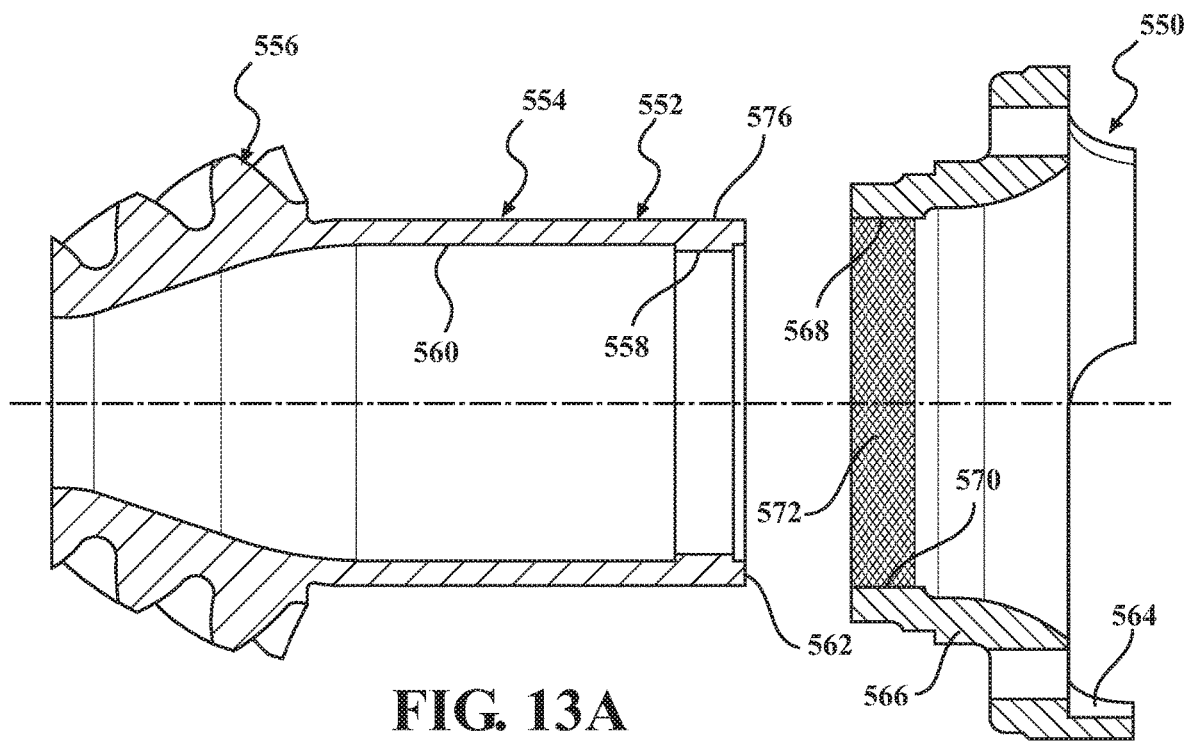
Figure 13B:
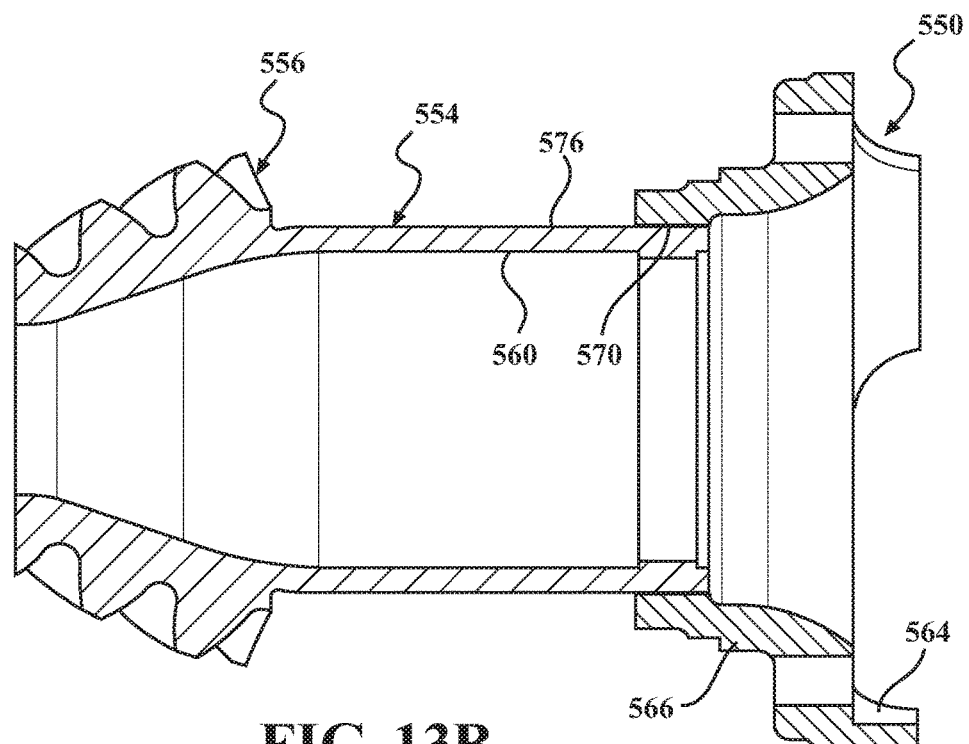
Figure 14A:
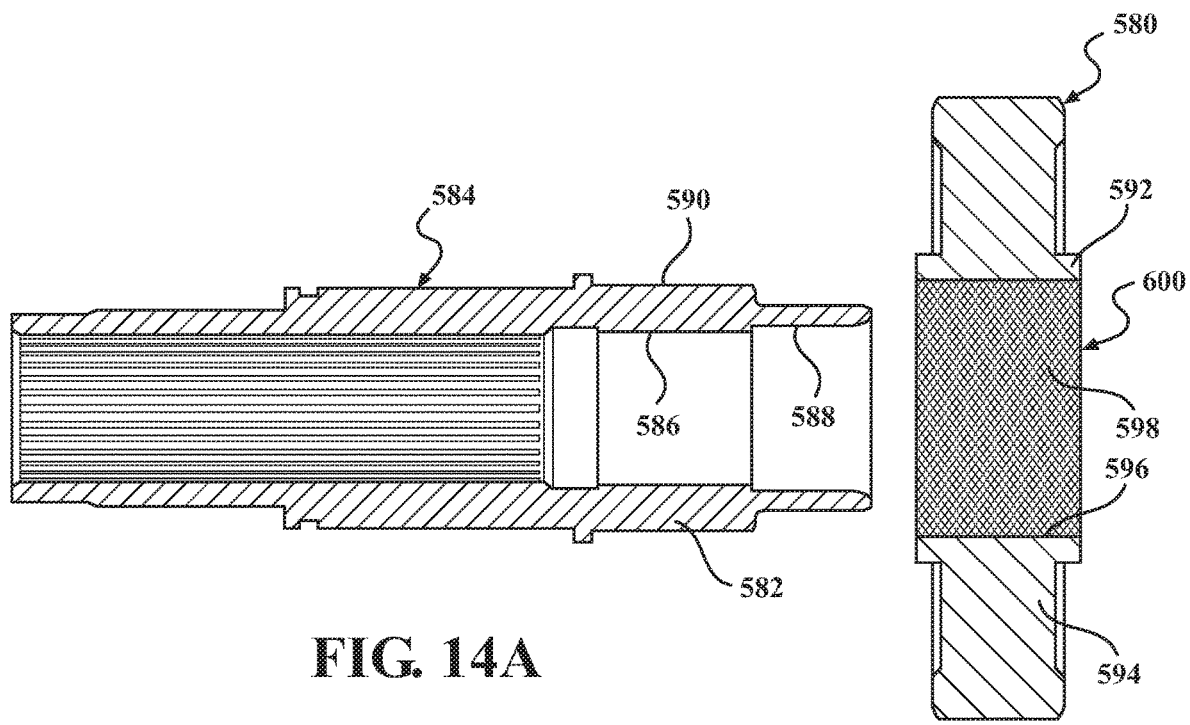
Figure 14B:
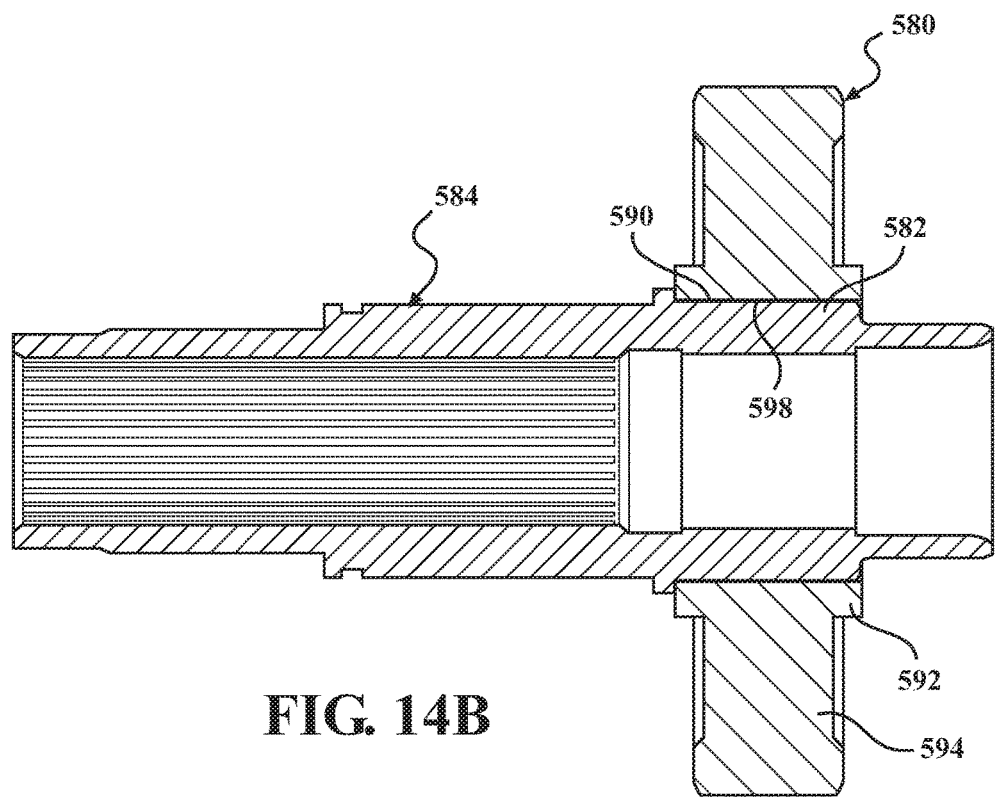

FIGS. 13A and 13B illustrate use of a method, similar to that shown in FIGS. 11A through 11C, for securing a coupling component to a gear shaft component of a PBC assembly constructed according to a fifth embodiment of the present disclosure; and FIGS. 14A and 14B illustrate use of a method, similar to that shown in FIGS. 13A and 13B, for securing a gear/sprocket component to a tubular shaft component in accordance with the teachings of the present disclosure.

DETAILED DESCRIPTION

Example embodiments will now be described more fully with reference to the accompanying drawings. The example embodiments are provided so that this disclosure will be thorough, and will fully convey the scope to those who are skilled in the art. In particular, various examples of different power transfer systems for motor vehicles will be described to which products and/or assemblies embodying the teachings of the present disclosure are well-suited for use. To this end, various power transfer assemblies including, without limitations, transfer cases, power take-off units, drive axle assemblies, torque transfer coupling, and differentials are disclosed which are equipped with a hypoid gearset having an integrated pinion, bearing and coupling (PBC) assembly constructed in accordance with the teachings of the present disclosure. However, numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

Figure 1:
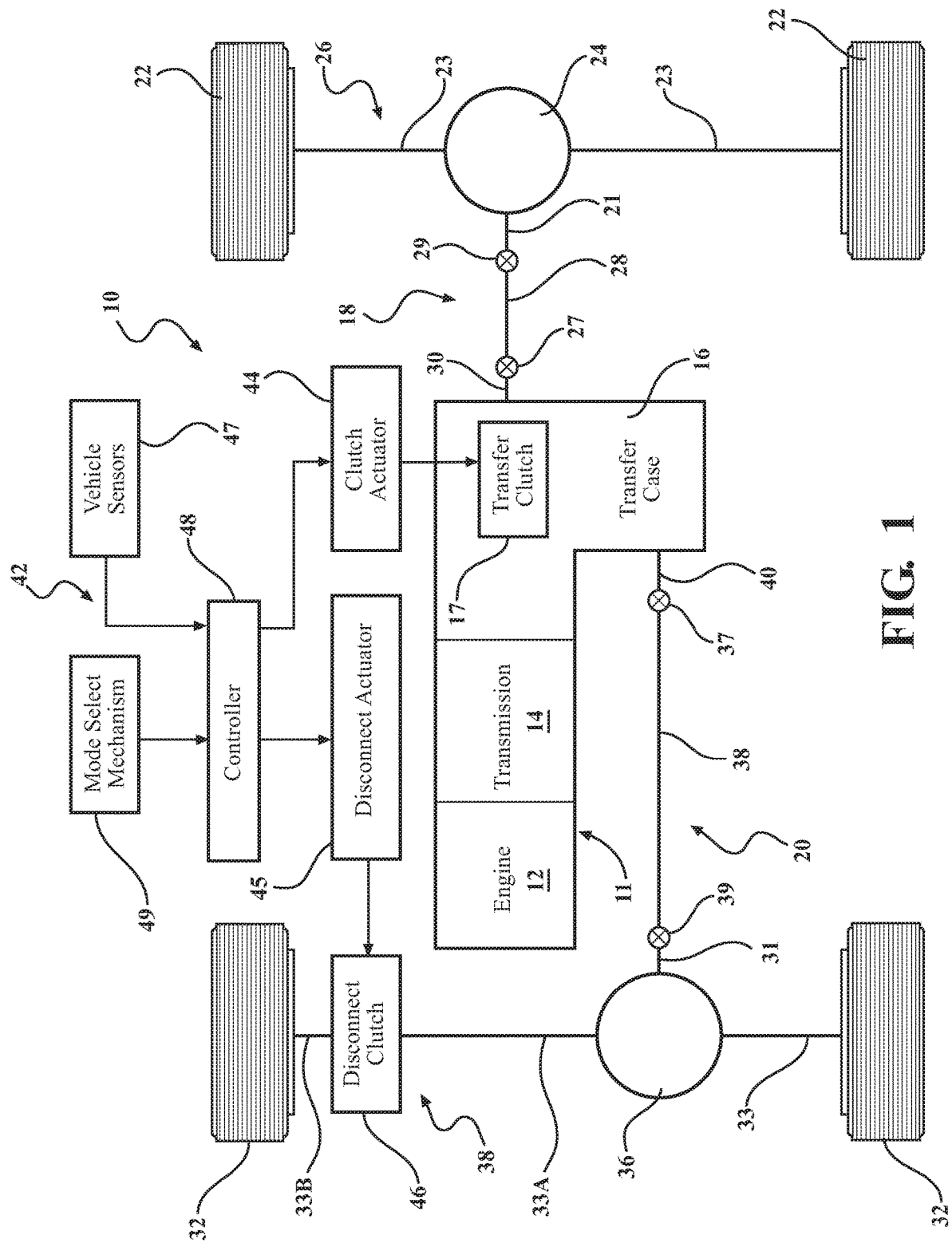
FIG. 1 is a schematic view of a four-wheel drive (4WD) motor vehicle equipped with a 4WD power transfer system having one or more products and/or assemblies embodying the teachings of the present disclosure.

Referring initially to FIG. 1, an example of a four-wheel drive (4WD) power transfer system for a motor vehicle 10 is shown. Motor vehicle 10 includes a powertrain 11 operable for generating and transmitting rotary power (i.e. drive torque) to a first or primary driveline 18 and a second or secondary driveline 20. Powertrain 11 is shown, in this non-limiting example, to include an internal combustion engine 12 and transmission 14. Primary driveline 18, hereinafter identified as the rear driveline, includes a pair of ground-engaging rear wheels 22 interconnected via a pair of rear axleshafts 23 to a rear differential 24 as part of a rear drive axle assembly 26. Secondary driveline 20, hereinafter identified as the front driveline, includes a pair of ground-engaging front wheels 32 interconnected via a pair of front axleshafts 33 to a front differential 36 defining a front drive axle assembly 36.

The power transfer system shown in FIG. 1 also includes a power transfer assembly, configured as a transfer case 16, and operable to receive drive torque from powertrain 11 and transmit such drive torque permanently to rear driveline 18 and selectively/automatically to front driveline 20. Transfer case 16 includes a rear output shaft 30, a torque transfer clutch 17, and a front output shaft 40. A first end of a rear propshaft 28, also associated with rear driveline 18, is drivingly connected via first joint coupling 27 to rear output shaft 30 while a second end of rear propshaft 28 is drivingly coupled via a second joint coupling 29 to an input component 21 of rear axle assembly 26. As such, rear propshaft 28 is configured to transmit drive torque from rear output shaft 30 of transfer case 16 to rear differential 24 of rear axle assembly 26. Similarly, a first end of a front propshaft 38 associated with front driveline 20 is drivingly connected via a first joint coupling 37 to front output shaft 40 while a second end of front propshaft 28 is drivingly connected via a second joint coupling 39 to an input component 31 of front axle assembly 36. Thus, front propshaft 38 is configured to transmit drive torque from front output shaft 40 of transfer case 16 to front differential 34 of front axle assembly 36. Rear input component 21 includes a rear pinion shaft driving a rear hypoid gearset for transmitting drive torque from rear propshaft 28 to rear differential 24. Likewise, front input component 31 includes a front pinion shaft driving a front hypoid gearset for transmitting drive torque from front propshaft 38 to front differential 34. As will be detailed, the present disclosure is directed to pinion shaft support and coupling arrangements that are applicable to one or both of input components 21 and 31.

With continued reference to FIG. 1 of the drawings, motor vehicle 10 is further shown, in this non-limiting embodiment, to include an electronically-controlled power transfer system 42 configured to permit a vehicle operator to select between a two-wheel drive (2WD) mode, a part-time or "locked" four-wheel drive (LOCK-4WD) mode, and an adaptive or "on-demand" four-wheel drive (AUTO-4WD) mode. In this regard, transfer case 16 is equipped with torque transfer clutch 17 that can be selectively actuated for transferring drive torque from powertrain 11 to front output shaft 40 for establishing the LOCK-4WD and AUTO-4WD modes of operation. The power transfer system 42 further includes a power-operated clutch actuator 44 for controlling actuation of transfer clutch 17, a power-operated disconnect actuator 45 for controlling actuation of a disconnect clutch 46, a plurality of vehicle sensors 47 for detecting certain dynamic and operational characteristics of the motor vehicle, a mode selector 49 for permitting the vehicle operator to select one of the available drive modes, and a controller unit 48 for controlling coordinated actuation of actuators 44, 45 in response to input signals from vehicle sensors 47 and a mode signal from mode selector 49. Front axle assembly 36 is of the "disconnectable" type and is shown with disconnect clutch 46 operably disposed between a pair of shaft segments associated with of one of front axleshafts 32.

To establish the 2WD mode, clutch actuator 44 is controlled to shift transfer clutch 17 into a "released" mode while disconnect actuator 45 is controlled to shift disconnect clutch 46 into a "disconnected" mode. With transfer clutch 17 in its release mode, no drive torque is transmitted through transfer clutch 17 to front output shaft 40 such that all drive torque is delivered from powertrain 11 to rear wheels 22 via rear driveline 18. With disconnect clutch 46 in its disconnected mode, axleshaft segments 33A, 33B are disconnected such that rotation of front wheels 32 during motive operation of vehicle 10 does not cause front propshaft 38 and front output shaft 40 to be back-driven.

To establish the lock-4WD mode, disconnect actuator 45 is controlled to shift disconnect clutch 46 into a "connected" mode and clutch actuator 44 is controlled to shift transfer clutch 17 into a "fully-engaged" mode. With transfer clutch 17 operating in its fully-engaged mode, rear output shaft 30 is, in effect, drivingly coupled to front output shaft 40 such that the drive torque is equally distributed therebetween. With disconnect clutch 46 in its connected mode, shaft segments 33A, 33B are drivingly connected such that drive torque delivered to front output shaft 40 is transferred via front driveline 20 to front wheels 32.

To establish the AUTO-4WD mode, disconnect clutch 46 is shifted into or maintained in its connected mode and clutch actuator 44 operates to adaptively regulate the drive torque distribution ratio between rear output shaft 30 and front output shaft 40 by varying operation of transfer clutch 17 between its released and fully-engaged modes. The desired distribution ratio is based on and determined by control logic associated with controller unit 48 and which is configured to automatically determine a desired amount of the total drive torque to be transferred to front output shaft 40 based on the operating characteristic and/or road conditions detected by sensors 47

Figure 2:
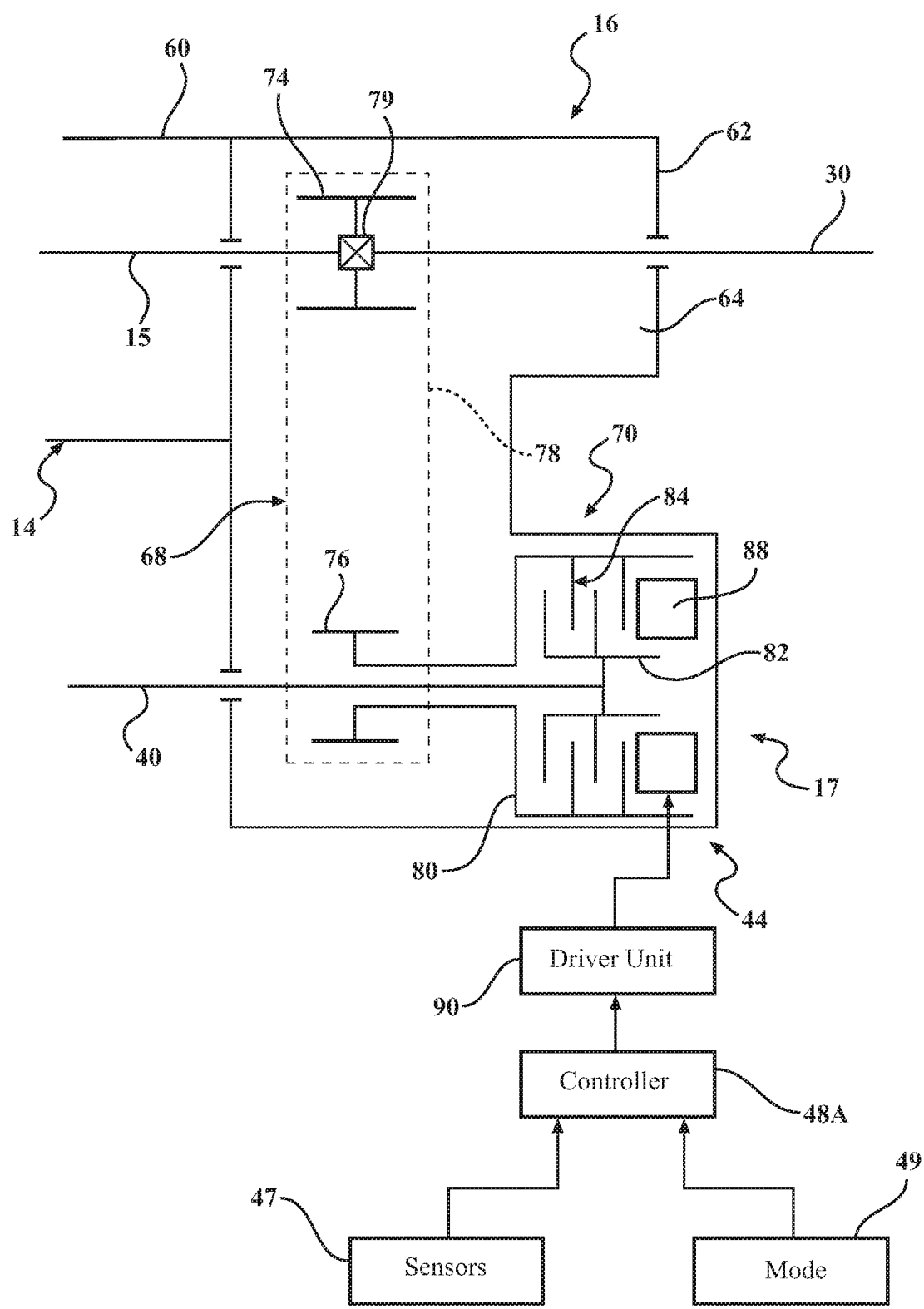
FIG. 2 is a diagrammatical illustration of a power transfer assembly, configured as a transfer case, associated with the 4WD power transfer system shown in FIG. 1.

Referring to FIG. 2, a non-limiting example of transfer case 16 will now be described. In the arrangement shown, a transmission output shaft 15 extends from a transmission housing 60 into a transfer case housing 62 that is adapted to be secured to transmission housing 60 and which defines an internal chamber 64. Transmission shaft 15 is coupled for common rotation with rear output shaft 30. Transfer case 16 is further shown in FIG. 2 to generally include a transfer assembly 68, with torque transfer clutch 17 configured to include a friction clutch assembly 70 controlled by power-operated clutch actuator 44. Transfer assembly 68 can be configured as a geared drive assembly or as a chain drive assembly. In the particular example disclosed, transfer assembly 68 is a chain and sprocket drive assembly having a first sprocket 74 drivingly coupled to rear output shaft 30, a second sprocket 76 rotatably supported on front output shaft 40, and a continuous power chain 78 encircling and meshing with both first sprocket 74 and second sprocket 76. A coupling interface 79, such as a spline connection, is schematically shown for indicating a direct coupling of first sprocket 74 for rotation with rear output shaft 30. Friction clutch assembly 70 is shown having a first clutch member 80 coupled for rotation with second sprocket 76, a second clutch member 82 coupled for rotation with front output shaft 40, and a multi-plate clutch pack 84 comprised of a plurality of interleaved inner and outer clutch plates. Power-operated clutch actuator 44 includes an operator mechanism 88 having an axially moveable apply device capable of applying a compressive clutch engagement force on clutch pack 84, and a powered driver unit 90 operable for controlling operator mechanism 88 so as to control the axial position of the apply device relative to clutch pack 84.

As is well known, the magnitude of the clutch engagement force generated by operator mechanism 88 and exerted by the apply device on clutch pack 84 is proportional to the amount of drive torque transmitted from rear output shaft 30 through transfer assembly 68 to front output shaft 40. Accordingly, when a predetermined minimum clutch engagement force is applied to clutch pack 84, a minimum drive torque is transmitted to front driveline 20. In contrast, when a predetermined maximum clutch engagement force is applied to clutch pack 84, a maximum drive torque is transmitted to front driveline 20. As such, adaptive control of the front/rear drive torque distribution ratio can be provided by actively controlling operation of transfer case 16 to establish a two-wheel drive (2WD) mode and an on-demand four-wheel drive (4WD) mode. FIG. 2 also illustrates a transfer case controller 48A, associated with vehicle controller 48 of FIG. 1, that is operable for controlling actuation of powered driver unit 90 which, in turn, controls the axial position of the apply device relative to clutch pack 84.

Figure 3:
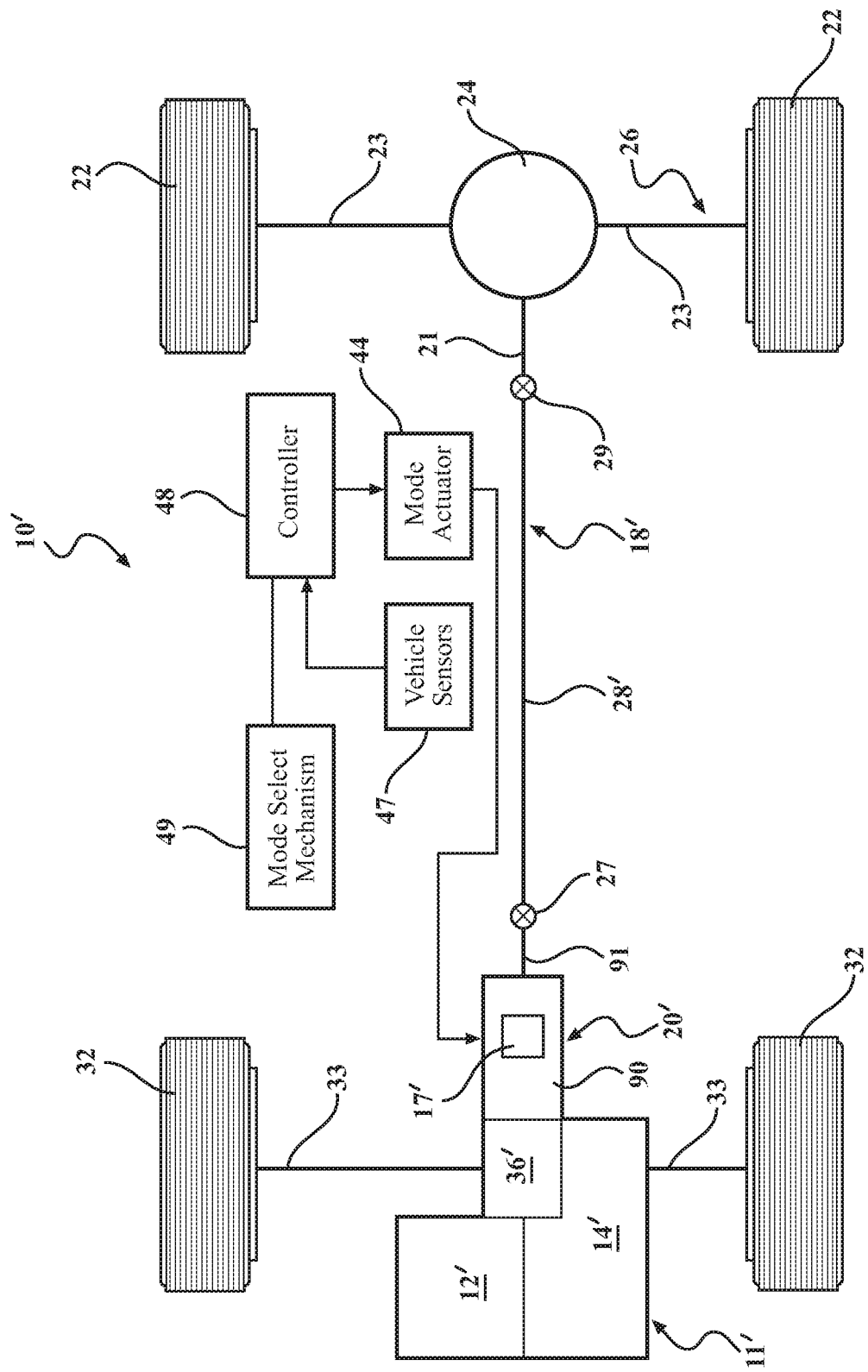
FIG. 3 is schematic view of an all-wheel drive (AWD) motor vehicle equipped with an AWD power transfer system having one or more products and/or assemblies embodying the teachings of the present disclosure.

Referring now to FIG. 3, an example of an all-wheel drive (AWD) power transfer system for a motor vehicle 10' is shown. Motor vehicle 10' includes a powertrain 11' comprised of an engine 12' and a transmission 14'. The primary driveline, in this non-limiting example, is front driveline 20'. Drive torque from powertrain 11' is transmitted through a front differential 34' to front wheels 32 via front axleshafts 33. The secondary driveline, in this embodiment, is rear driveline 18'. As will be described, the first end of a rear propshaft 28' is drivingly interconnected to an output component 91 of a power transfer assembly, hereinafter referred to as power take-off unit 90. Furthermore, output component 91 of power take-off unit 90 includes a pinion shaft driven by a hypoid gearset for transmitting drive torque from powertrain 11' to rear propshaft 28'. As will be detailed, the present disclosure is directed to pinion shaft support and coupling arrangements that are applicable to output component 91.

Figure 4:
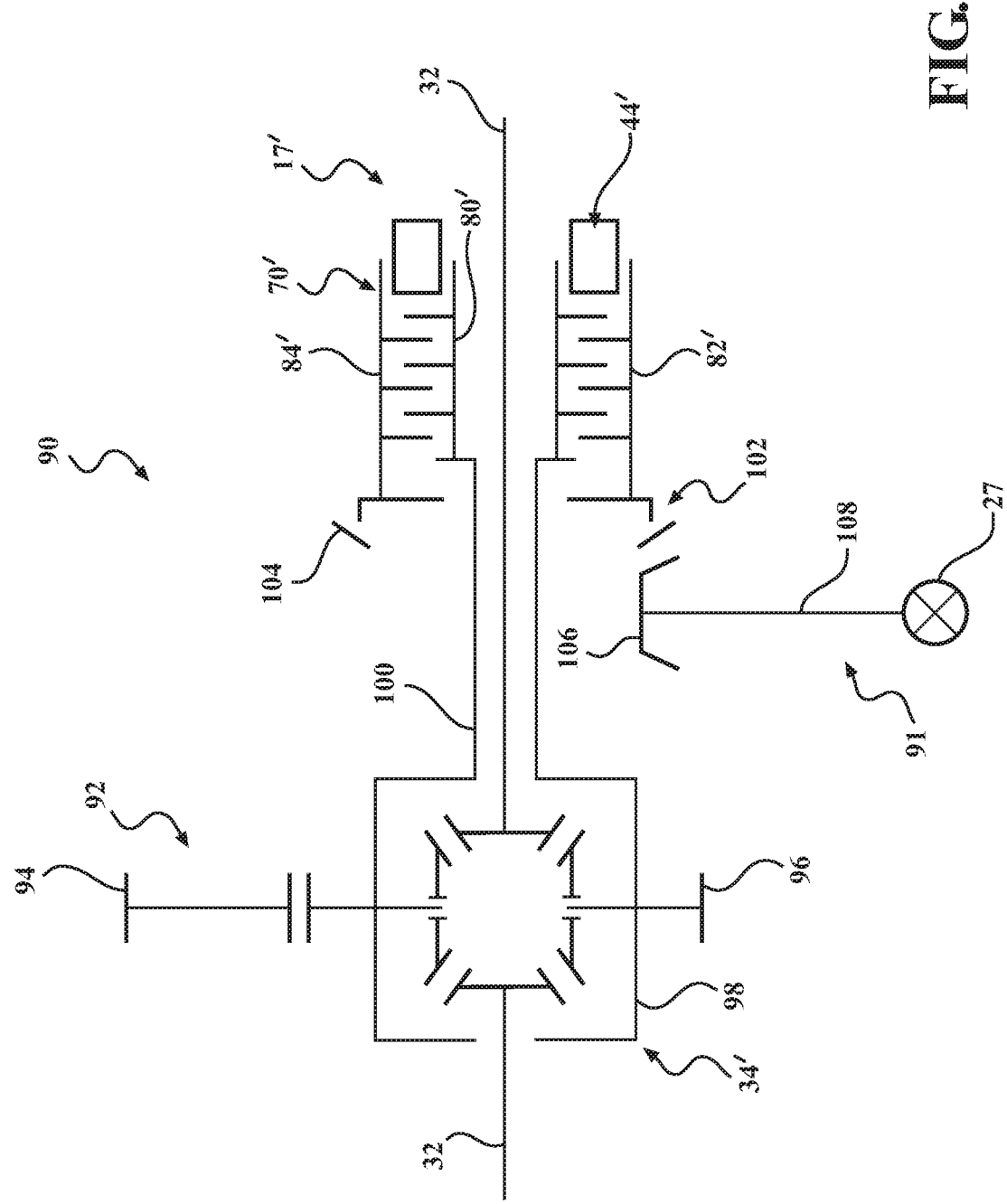
FIG. 4 is a diagrammatical illustration of a power transfer assembly, configured as a power take-off unit, associated with the AWD power transfer system shown in FIG. 3.

FIG. 4 diagrammatically illustrates a non-limiting example of power take-off unit (PTU) 90. A final drive gearset 92 of transmission 14' includes an output gear 94 driving a ring gear 96 fixed to a differential carrier 98 of front differential 34'. PTU 90 includes an input shaft 100 driven by gearset 92 or differential carrier 98, a hypoid gearset 102, and a torque transfer clutch 17' therebetween. Hypoid gearset 102 includes a crown gear 104 meshed with a pinion gear 106 which, in turn, is drivingly connected to a pinion shaft 108 which acts as output component 91. Torque transfer coupling 17' includes clutch assembly 70' and power-operated clutch actuator 44'. Clutch assembly 70' includes a first clutch member 80' coupled to input shaft 100, a second clutch member 82' coupled to crown gear 104, and a multi-plate clutch pack 84'. When a minimum clutch engagement force is applied to clutch pack 84', a minimum drive torque is transmitted via hypoid gearset 102 to rear driveline 18'. In contrast, when a maximum clutch engagement force is applied to clutch pack 84', a maximum drive torque is transmitted via hypoid gearset 102 and pinion shaft 108 to rear driveline 18'. Thus, adaptive control over the engagement of clutch pack 84' results in the on-demand transfer of drive torque to rear driveline 18'. This allows establishment of the above-noted 2WD and 4WD modes of operation for vehicle 10'. While only shown schematically, power-operated clutch actuator 72' is again configured to include an operator mechanism 88 and a powered drive unit 90 operable to adaptively regulate the magnitude of the clutch engagement force applied to clutch pack 84'.

Figure 5:
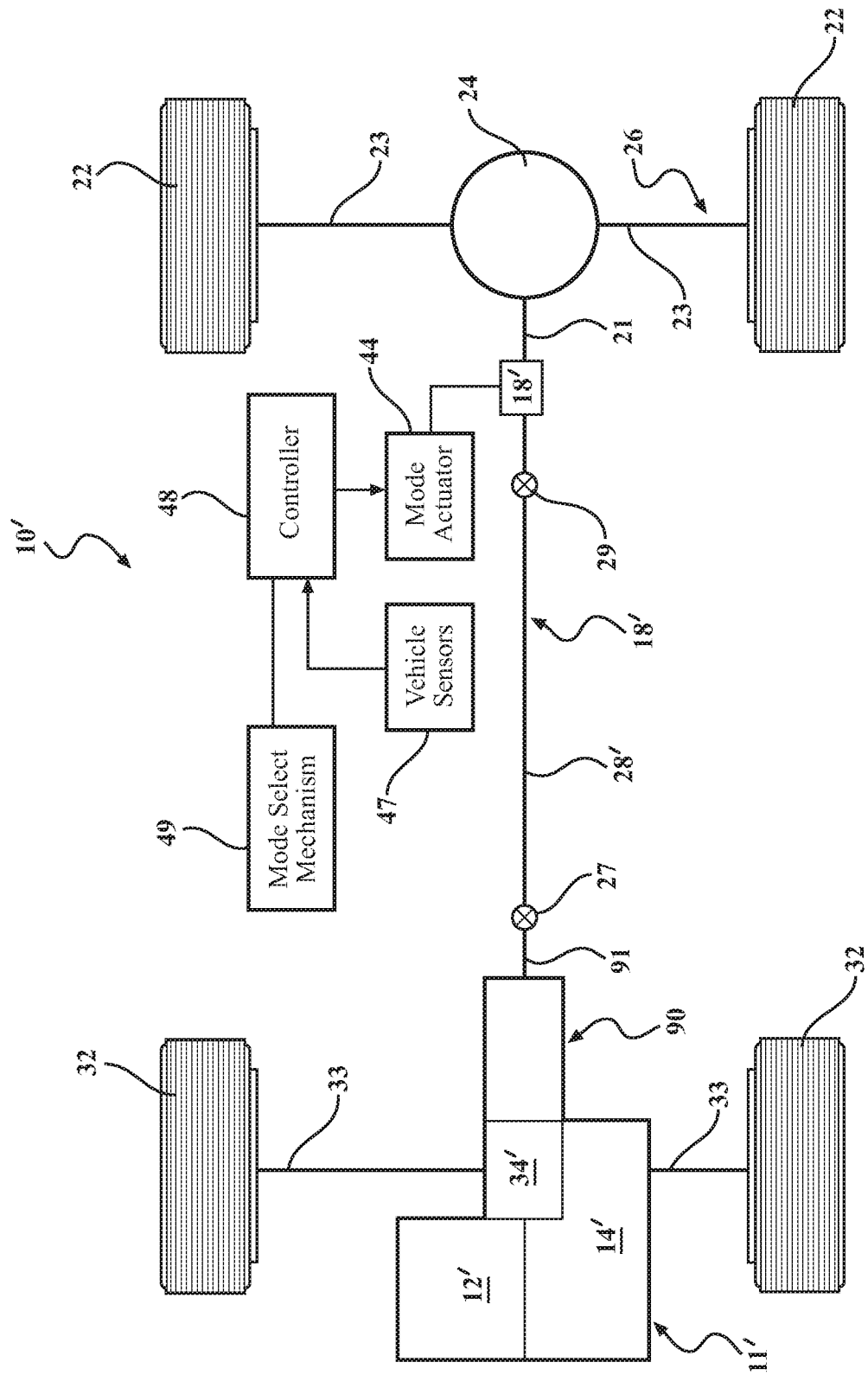
FIG. 5 is a diagrammatical view of an alternative version of the all-wheel drive vehicle shown in FIG. 3 and which is equipped with an AWD power transfer system having one or more products and/or assemblies embodying the teachings of the present disclosure.
Figure 6:
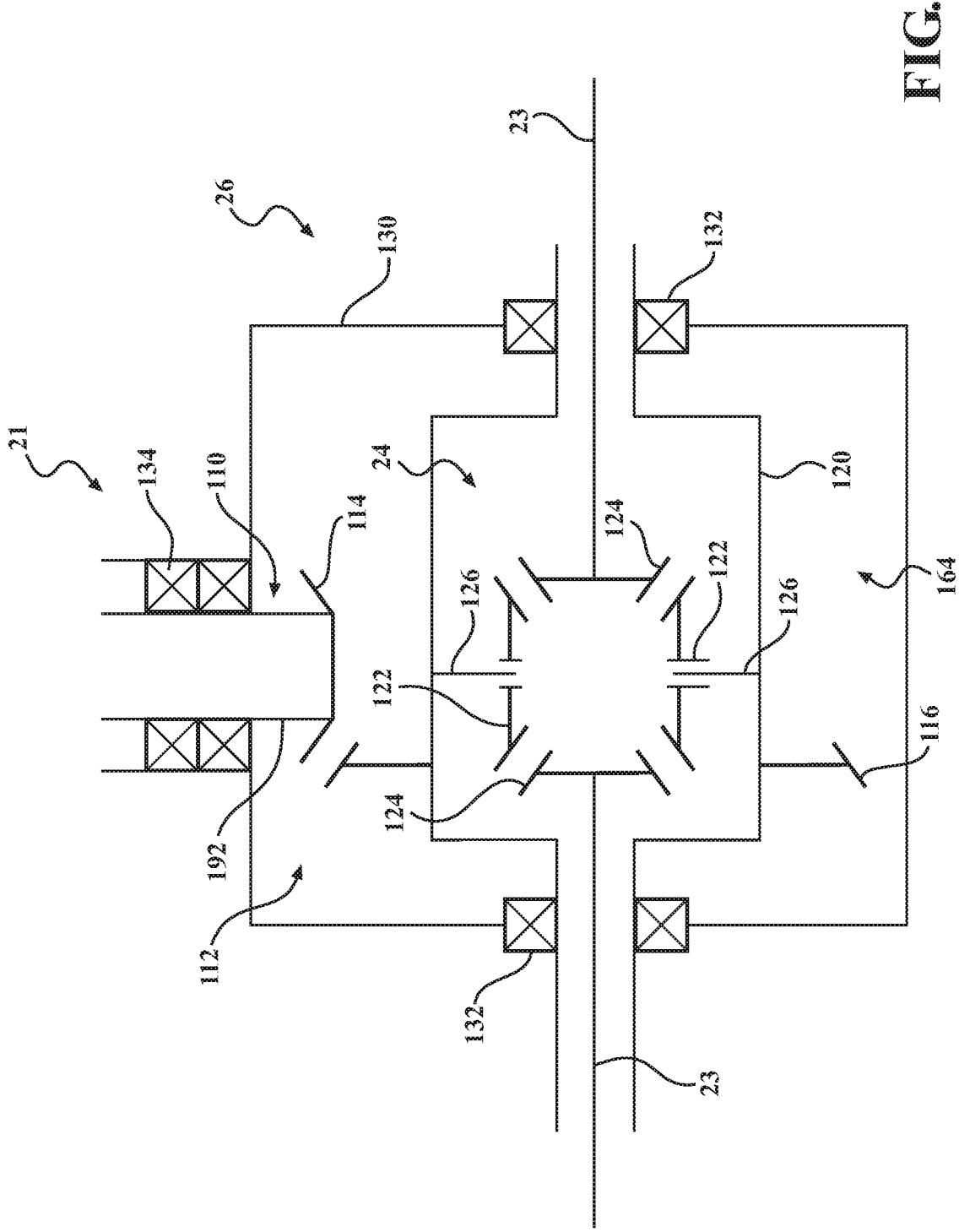
FIG. 6 is a schematic view of a power transfer assembly, configured as a torque transfer unit, associated with AWD power transfer shown in FIG. 5.

Referring now to FIG. 5, a revised version of AWD motor vehicle 10' is now shown with torque transfer clutch 17' removed from PTU 90 and operably disposed between rear propshaft 28' and input component 21 to rear axle assembly 26. As best seen from FIG. 6, input component 21 is shown to include a pinion shaft 110 and a hypoid gearset 112. Pinion shaft 110 is adapted to be coupled to one of the clutch members of friction clutch assembly 70'. Hypoid gearset 112 includes a pinion gear 114 meshed with a ring gear 116. Pinion gear 114 is fixed to pinion shaft 110 while ring gear 116 is fixed for rotation with a differential carrier 120 of rear differential 24. Rear differential 24 is further shown to include a differential gearset disposed with carrier 120 and including at least one pair of bevel differential pinions 122 each meshed with a pair of bevel differential side gears 124. Differential pinions 122 are rotatably support of pins 126 fixed for rotation with carrier 120. Each differential side gear 124 is drivingly connected to a corresponding one of rear axleshafts 23. Rear axle assembly 26 includes an axle housing 130. Carrier 120 of rear differential 24 is rotatably supported by a pair of laterally-spaced bearing units 132 within axle housing 130. Likewise, pinion shaft 110 is shown rotatably supported within axle housing 130 via a cartridge-type bearing unit 134. Actuation of power-operated actuator 44' again functions to control the amount of drive torque transmitted from rear propshaft 28' to rear differential 24 via clutch 70' and hypoid gearset 112.

The above configurations are clearly illustrated to incorporate a hypoid gearset into one or more products and/or assemblies associated with rear axle assembly 26, front axle assembly 36, and/or PTU 90. Accordingly the following detailed description of various embodiments of the present disclosure is sufficient to provide one skilled in this art an understanding and appreciation of the structure and function of the following.

Figure 7:
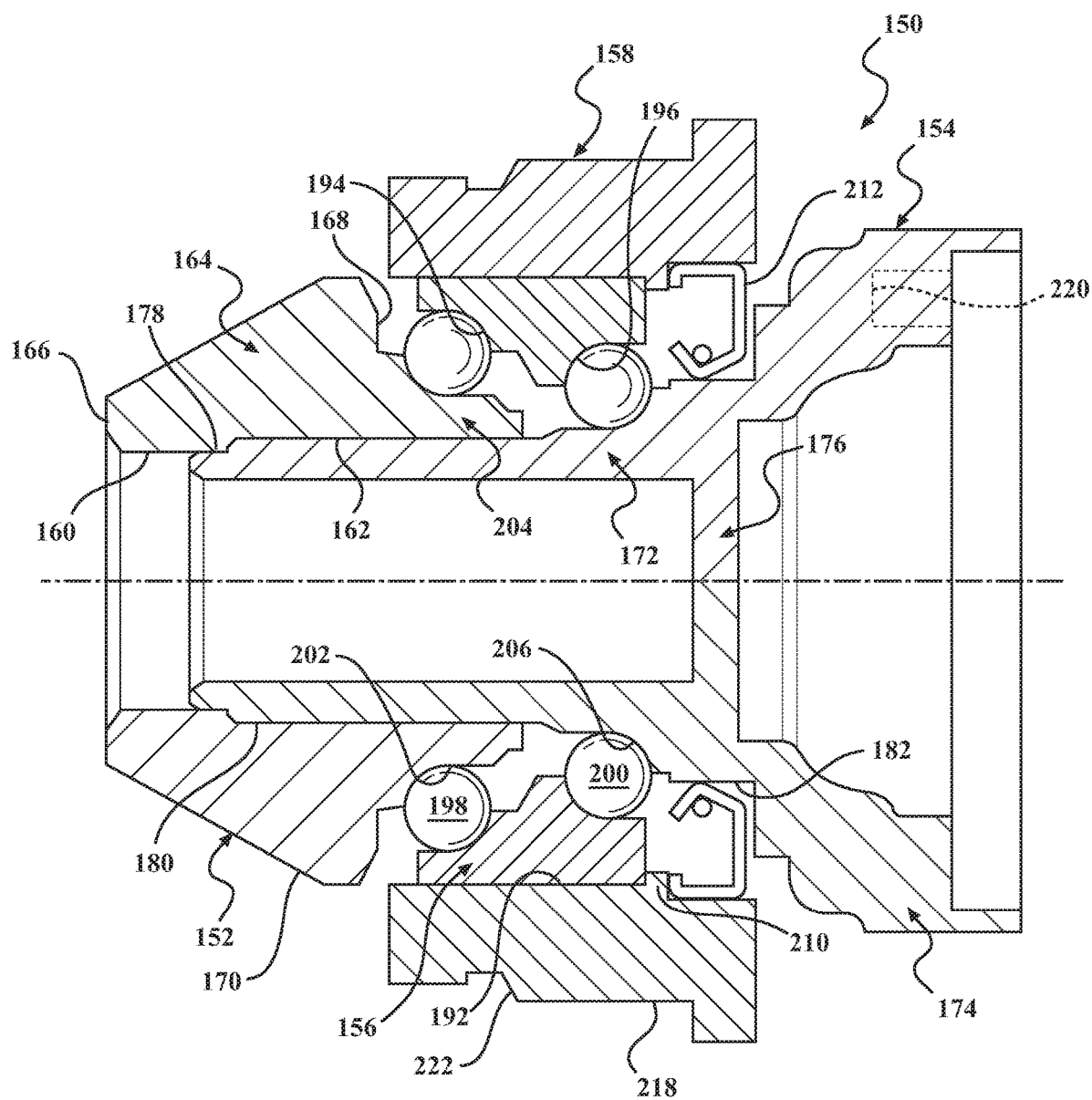
FIG. 7 is a sectional view of an integrated pinion-bearing-coupling (PBC) assembly adapted for use with any of the previously-noted power transfer systems and which is constructed in accordance with a first embodiment of the present disclosure.

Referring now to FIG. 7, an integrated pinion-bearing-coupling assembly, hereinafter referred to as PBC assembly 150, is shown to generally include a pinion head 152, a coupler 154, a bearing unit 156, and a lock collar 158. Pinion head 152 is a tubular component having a stepped inner surface defined by a first cylindrical surface 160 and a second cylindrical surface 162. A gear segment 164 of pinion head 152 includes a leading edge 166 and a trailing edge 168, between which gear teeth 170 are formed. An integral pinion hub shaft segment 204 extends axially from trailing edge 168 of gear segment 164. Coupler 154 is shown to include a tubular coupler shaft segment 172 and a coupler flange segment 174 delineated by an endcap segment 176. A stepped outer surface of shaft segment 172 is defined by a first cylindrical surface 178, a second cylindrical surface 180, and a third cylindrical surface 182. Bearing unit 156 includes a bearing ring 190 press-fit into a cylindrical bore 192 formed in lock collar 158 and which defines a first annular outer race surface 194 and second annular outer race surface 196. Bearing unit 156 also includes a set of first rollers 198 and a set of second rollers 200.

With continued reference to FIG. 7, a first inner race surface 202 is formed in tubular pinion hub shaft segment 204 and extends axially from trailing edge 168 of pinion head 152. Likewise, a second inner race surface 206 is formed in coupler shaft segment 172 of coupler 154 at an interface between its second and third cylindrical surfaces 180, 182. First rollers 198, shown as ball bearings, are disposed between first outer race surface 194 of bearing ring 190 and first inner race surface 202 formed on pinion hub shaft segment 204 of pinion head 152. Likewise, second rollers 200, also shown as ball bearings, are disposed between second outer race surface 196 of bearing ring 190 and second inner race surface 206 on coupler shaft segment 172 of coupler 154. A flange ring 210 axially locates bearing ring 190 with respect to lock collar 158. As seen, a rotary seal unit 212 is disposed between lock collar 158 and third outer cylindrical surface 182 of coupler shaft segment 172.

Pinion head 152 is configured to be rigidly secured to coupler shaft segment 172 of coupler 154 for common rotation therewith. In accordance with one non-limiting fixation technique, first and second inner surfaces 160 and 162 of pinion head 152 can be press-fit into engagement with corresponding first and second outer surfaces 178 and 180 on shaft segment 172. Such press-fit engagement permits desired clearances to be established between first and second sets of bearing rollers 198 and 200 and their corresponding inner and outer race surfaces. This feature also permits elimination of separate inner race rings since they are integrated directly into pinion hub segment 204 of pinion head 152 and coupler shaft segment 172 of coupler 154, respectively. In addition, lock collar 158 includes external threads 218 that are adapted to mesh with internal threads (not shown) formed on a housing (not shown) to facilitate precise setting of the pinion depth (gear system backlash/pattern) relative to a ring gear associated with a hypoid gearset. The selection of the particular bearing elements also provides proper pinion gear deflection values to insure that the contact patterns between pinion teeth 170 and the teeth of the mating ring gear is optimized. Following proper axial positioning of PBC assembly 150, via threaded engagement of lock collar 158 with the housing, lock collar 158 is fixed to the housing (via staking, welding, etc.). Thereafter, a drive member (i.e. the joint coupling, propshaft, etc.) can be secured to coupling flange section 174 of coupler 154 via suitable fasteners (not shown) mounted in bores 220. Lock collar 158 also includes an annular groove 222 configured to receive and retain a seal member, such as an O-ring, between it and the housing.

Figure 8:
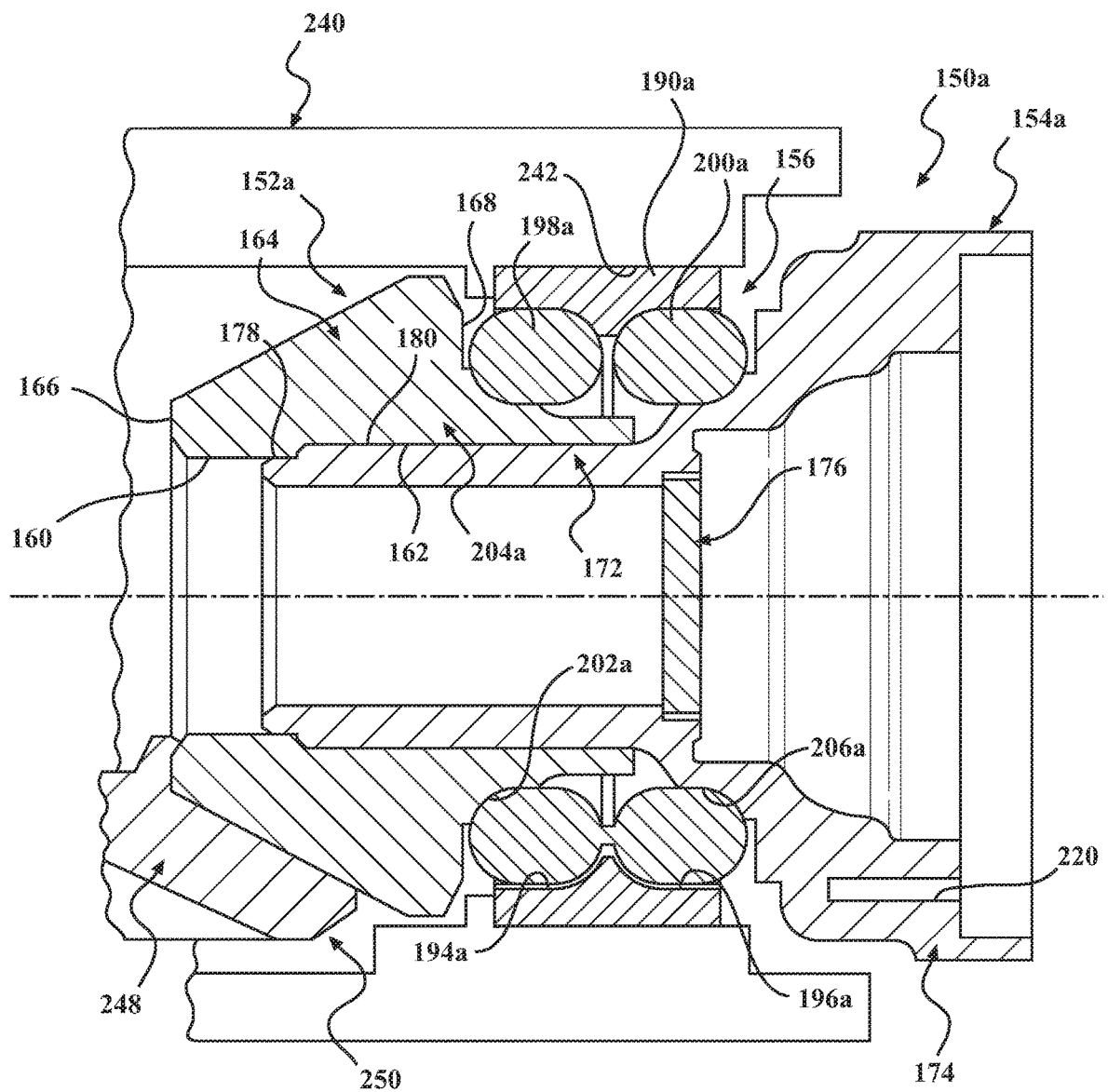
FIG. 8 is a sectional view of an integrated PBC assembly constructed in accordance with a second embodiment of the present disclosure.

Referring now to FIG. 8, various components of a second embodiment of a PBC assembly 150A are shown in association with an axle housing 240 defining a pinion mounting segment 244 having a cylindrical aperture 242, and a ring gear 248 which together with gear segment 164A of pinion head 152 defines a hypoid gearset 250. Ring gear 248 is fixed for rotation with a differential carrier which rotatably supports at least one pair of bevel pinions from pinion posts. PBC assembly 150A is generally similar to PBC assembly 150 of FIG. 7 with the exception that oblong or "pill-shaped" rollers 198A and 200A replace ball rollers 198 and 200. The mating inner and outer race surfaces are identified with common numbers now having an "A" suffix. This alternative configuration provides optimized stress and deflection characteristics. Specifically, oblong rollers 198A, 200A provide added stiffness and a greater bearing contact patch for longer service life and extended surface contact fatigue. Thus, PBC assembly 150A illustrates that alternative bearing configurations can be used to address thrust loading. Bearing block 190A is shown pressed into housing aperture 242 until its front edge surface engages a flange ring 246 extending radially inwardly from pinion mounting segment 244 of axle housing 240. Alternatively, lock collar 158 can be used to axially locate bearing block 190A, in a manner similar to that shown in FIG. 7, with lock collar 158 being installed in aperture 242.

FIGS. 9A through 9D illustrates another alternative embodiment of a PBC assembly, identified therein by reference numeral 150B. For clarity, those components that are generally similar in structure and/or function to previously described components are hereafter identified by common reference numerals followed by a "B" suffix. As is seen, FIG.

Figure 9B:
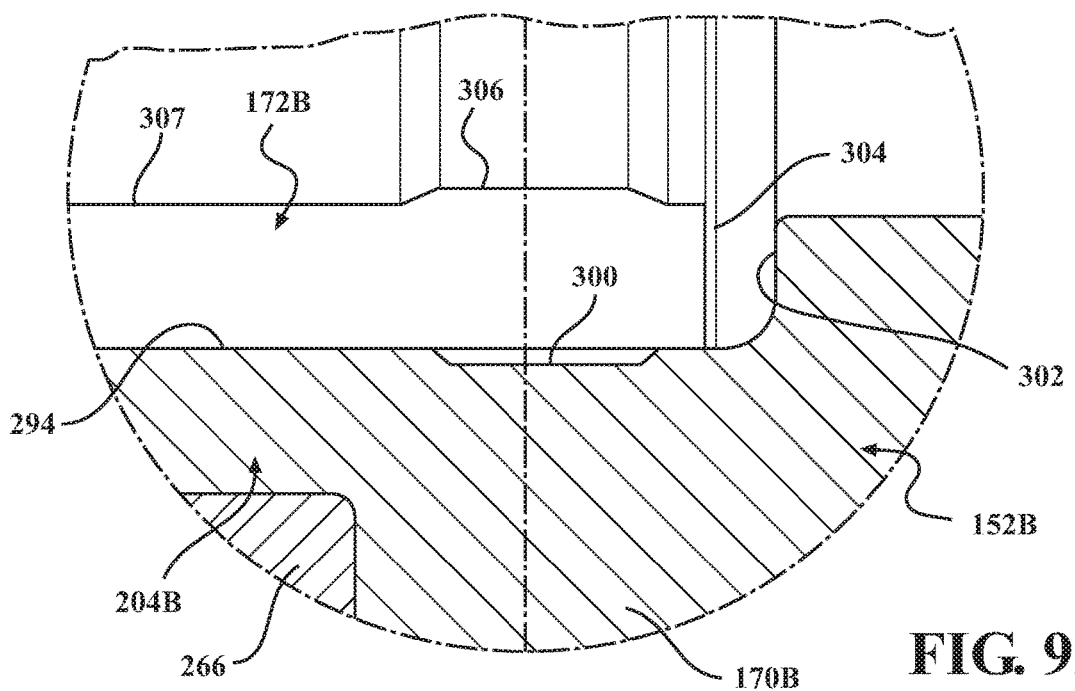
Figure 9C:
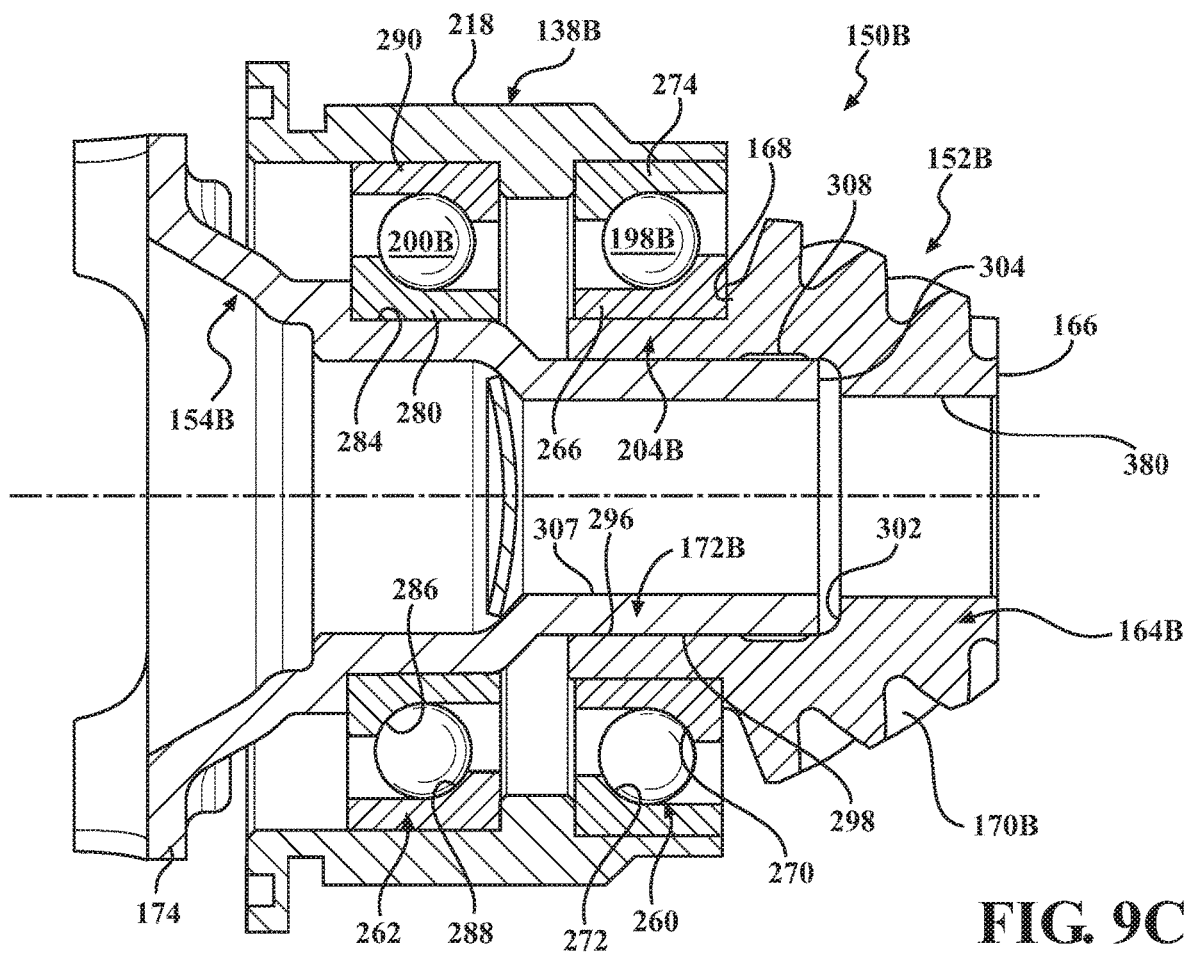
Figure 9D:
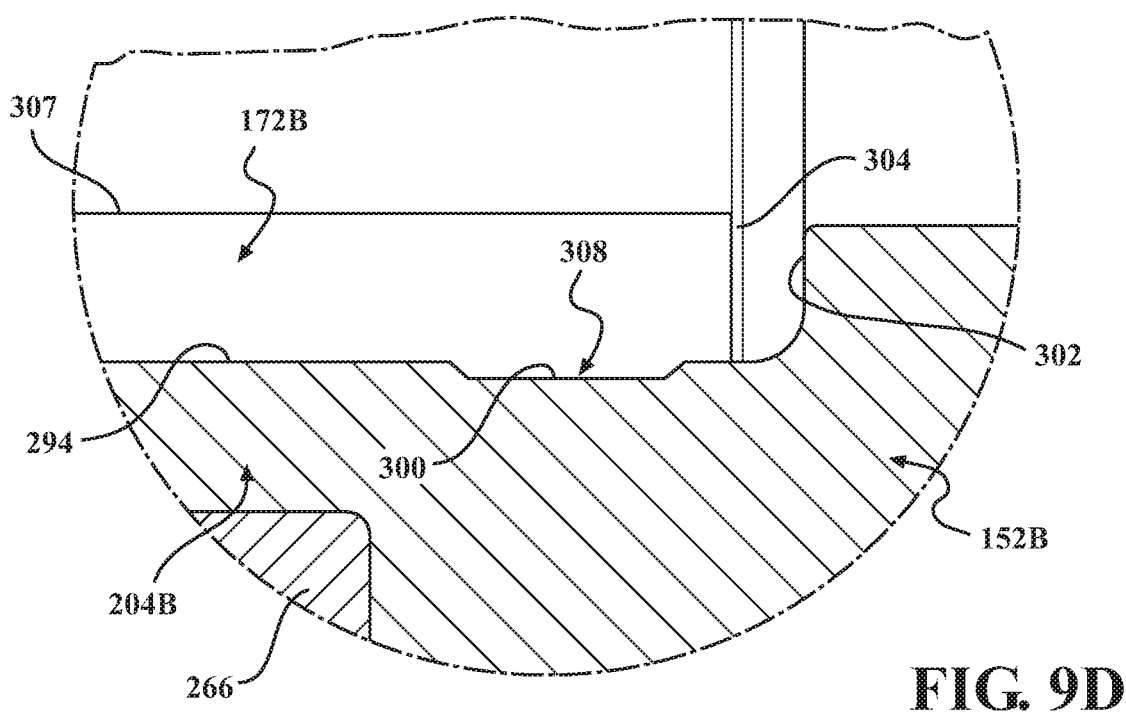

9A illustrates pinion head 152B prior to assembly and fixation to coupler shaft segment 172B of coupler 154B, with bearing unit 156B and lock collar 158B already assembled onto coupler 154B. FIG. 9B is an enlarged partial view showing pinion head 152B installed on coupler shaft segment 204B of coupler 154B, but prior to the fixation process. FIG. 9C illustrates PBC assembly 150B with pinion head 152B installed on and fixed to coupler shaft segment 172B of coupler 154B. Finally, FIG. 9D is an enlarged partial view of FIG. 9C showing greater details of the method used to securely fix pinion head 152B to coupler 154B.

In this configuration, bearing unit 156B now is shown to include a first bearing assembly 260 and a second bearing assembly 262 separated by a spacer ring 264. First bearing assembly 260 includes an inner race ring 266 having an inner surface 267 configured to be press-fit to an outer surface 268 formed on hub segment 204B of pinion head 152B. Rollers 198B are disposed between race surface 270 of inner ring 226 and a race surface 272 formed in an outer race ring 274. Outer race ring 274 is pressed into a first aperture 276 formed in lock collar 158B. Second bearing assembly 262 includes an inner race ring 280 having an inner surface 282 press-fit on a raised boss portion 284 of shaft segment 172B. Rollers 200B are disposed between a race surface 286 on inner race ring 280 and a race surface 288 formed in an outer race ring 290.

As best seen in FIG. 9A, an internal surface 294 formed in hub segment 204B of pinion head 152B includes a series of projections 296 (i.e. splines, serrations, knurling, etc.) adapted to be press-fit against an outer cylindrical surface 298 formed on shaft segment 172B of coupler 154B. While not limited thereto, projections 296 can extend outwardly from surface 294 to define "raised" projections. An annular receiver groove 300 is formed in inner surface 294 adjacent to a radial stop surface 302. Upon press-fitting of pinion head 152B onto coupler shaft section 172B, an end surface 304 thereon is positioned in proximity to stop shoulder 302, as is best seen in FIG. 9B. Thereafter, an annular rim flange 306 which is formed to extend radially inwardly from an inner diameter surface 307 of shaft segment 204B adjacent end surface 304, is radially outwardly deformed (i.e. "upset") so as to move a ring of deformed material 308 into annular receiver groove 300, thereby axially retaining pinion head 152B on coupler shaft segment 172B, as is best shown in FIGS. 9C and 9D. One joining method could include forcing a mandrel through coupler shaft segment 172B which would function to radially deform rim flange 306 outwardly so as to establish and locate a continuous annular ring of deformed material 308 within receiver groove 300.

Figure 10:
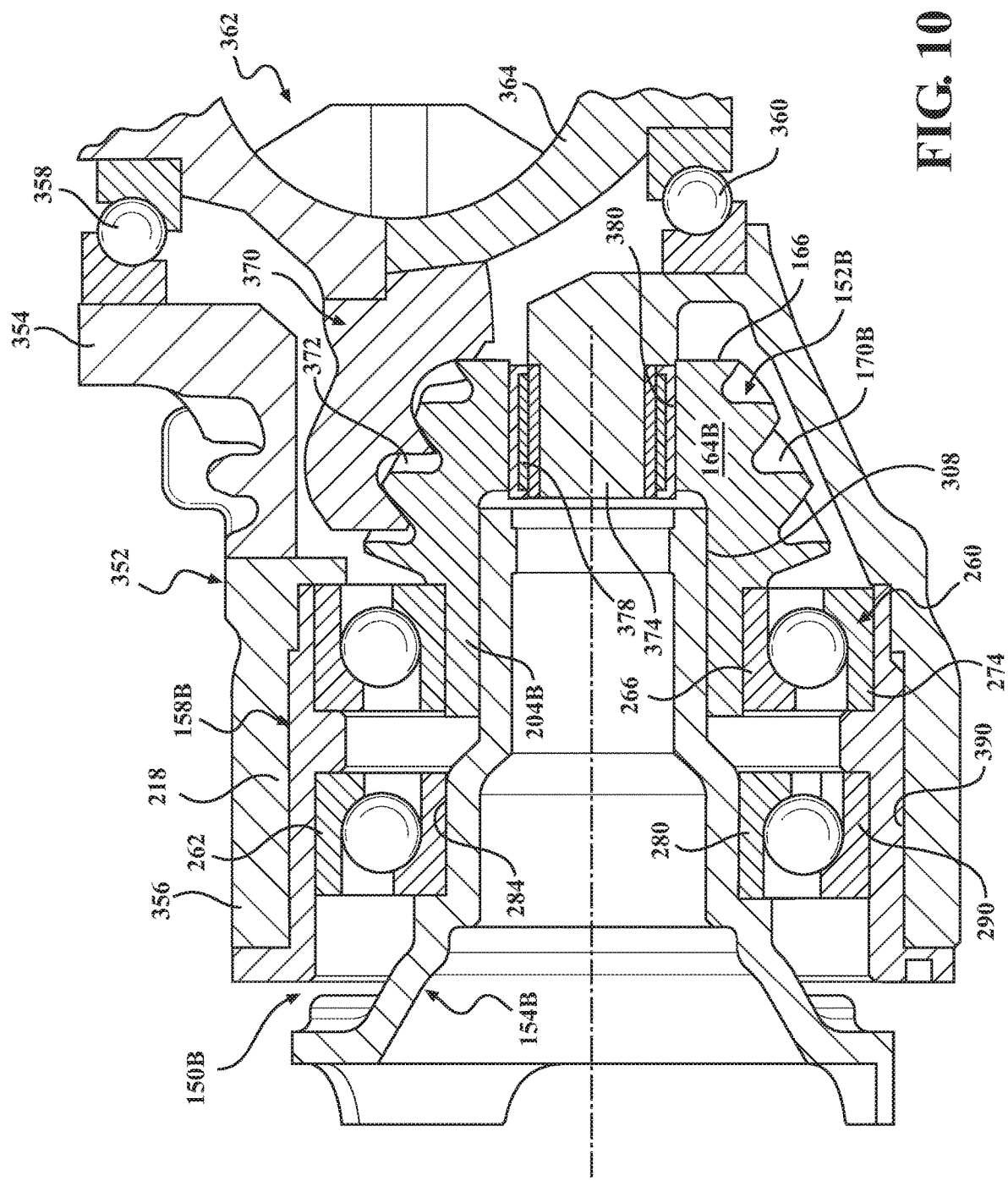
FIG. 10 is a sectional view illustrating a fourth embodiment of an integrated PBC assembly of the present disclosure in relation to portions of an axle assembly.

Referring now to FIG. 10, a slightly modified version of integrated PBC assembly 150B of FIGS. 9A-9D is shown prior to and after assembly into a drive axle assembly. The axle assembly includes an axle housing 352 having a first housing section 354 secured to a second housing section 356. A pair of laterally-spaced bearing units 358 and 360 rotatably support a differential assembly 362 in axle housing 352. Differential assembly 362 includes a differential carrier 364, with a ring gear 370 fixed (i.e. welded) to carrier 364 so as to be rotatably fixed thereto. Ring gear 370 includes teeth 372 configured to mesh with teeth 170B on pinion head 152B of PBC assembly 150B. A pinion post 374 extends outwardly from housing section 356. A bearing assembly 378 is installed on pinion post 374. Pinion head 152B includes a bore 380 that is delineated from bore 294 in hub segment 204B by a radial lip flange 302. Bore 380 is sized to be press-fit onto bearing assembly 378 upon installation of integrated PBC assembly 150B into pinion housing portion 376 of axle housing 352. As noted previously, lock collar 158B includes external threads 218 configured to mate with internal threads 390 formed in tube portion 356 to facilitate axial positioning and retention of PBC assembly 150B therein. The support bearing arrangement shown in FIG. 10 is well-suited for use in a PTU, such as shown in FIG. 4, or any type of drive axle assembly configuration.

Referring now to FIGS. 11A-11C, an alternative method for fixing the pinion head to the coupler shaft segment of the coupler for any of the integrated PBC assemblies previously disclosed will now be detailed. However, this method is not limited specifically for use with integrated PBC assemblies and, as such, generic component designations will be used. Specifically, FIGS. 11A-11C illustrate a fixation method for use with a shaft segment 172C and a gear 152C. Shaft segment 172C includes a first tubular portion 400, a second tubular portion 402, and an intermediate portion 404 interconnecting the first and second tubular portions. A cylindrical outer surface 408 of first tubular portion 400 and a cylindrical outer surface 410 of second tubular portion 402 are connected by a radial face surface 412. A radially-inwardly extending annular rim flange 306C extends from a cylindrical inner surface 307C on first tubular portion 400 of shaft segment 172C in proximity to an end surface 304C of first tubular portion 400.

In contrast to the elongated series of projections 296 formed in inner surface 294 of gear hub segment 204B associated with PBC assembly 150B shown in FIG. 9A, gear 152C is configured to include a gear segment 164C and a tubular shaft segment 204C together defining a bore 414 having an inner diameter surface 294C formed to include a non-raised surface portion 416 and a raised surface portion 418. More specifically, non-raised surface portion 416 of inner surface 294C is formed without any surface projections so as to define a smooth cylindrical surface profile. In contrast, raised surface portion 418 extends radially-inwardly relative to non-raised portion 416 and defines a non-smooth surface, hereafter referred to as knurled surface portion 418. As best seen in FIG. 11B, a receiver groove 420 is formed between knurled surface portion 418 and non-raised surface portion 416. A radial stop surface 302C delimits receiver groove 420.

Upon assembly of first tubular portion 400 of shaft segment 172C into bore 414 of gear 152C, an interference fit is established between cylindrical outer surface 408 of first tubular portion 400 and inner diameter surface 294C of gear 152C. FIG. 11B clearly illustrates the general alignment of rim flange 206C with respect to receiver groove 420 and the engagement between knurled surface portion 418 and end portion of cylindrical outer surface 408. FIG. 11C illustrates that, following an upsetting operation being applied to rim flange 306C, a ring of deformed material 308C has moved into receiver groove 420 and into engagement with knurled surface portion 418. This upsetting operation generates a continuous ring of deformed material 308C which improves torque transfer between gear 152C and shaft 172C while also providing enhanced axial retention therebetween. Obviously, raised surface portion 418 in stub shaft segment 204C can have other raised projections in substitution for the disclosed knurling and which cooperates with the deformed ring of deformed material 308C to provide the desired torque transfer and axial retention features. Thus, raised surface portion 418 of inner surface 294C can be formed to include projections including, without limitation, knurls, serrations, splines, etc.

Figure 12:
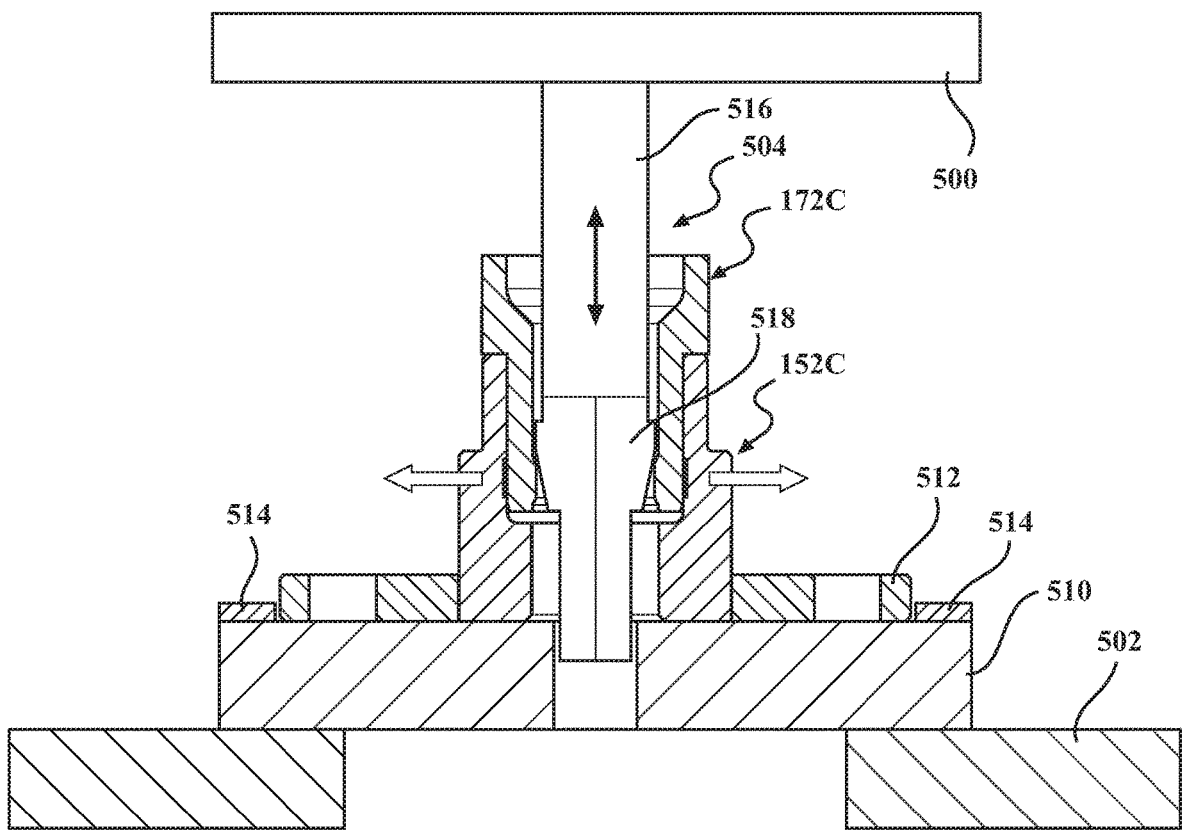
FIG. 12 illustrates an arrangement for performing the method shown in FIGS. 11A through 11C.

FIG. 12 illustrates a tooling and press arrangement configured for providing the upsetting process disclosed above in relation to PBC assembly 150B of FIGS. 9A-9D and/or in relation to fixation of gear 152C to shaft segment 172C of FIGS. 11A-11C. For convenience, the arrangement of FIGS. 11A-11C will be used in associated with FIG. 12. The tooling and press arrangement shown generally includes a ram 500 and a base 502 associated with a press, and a tooling unit 504 operable in association with ram 500 and base 502 to complete the upsetting process. Tooling unit 504 includes a guide 510 secured to base 502 of the press, one or more clamp plates 512 surrounding gear 152C, and clamps 514 for holding clamp plate(s) 512 and gear 152C on guide 510. A ram bar 516 is driven by ram 500 for moving a mandrel 518 that is configured to radially-outwardly deform (i.e. expand) annular rim flange 306C of shaft 172C into receiver groove 420 and into engagement with knurled surface of gear 152C. Following the upsetting process, mandrel 518 and ram bar 516 are retracted to permit removal of the attached shaft/gear product from the press.

FIGS. 13A and 13B illustrate use of the upsetting process of securing a coupling component 550 to a tubular pinion shaft segment 552 of a one-piece pinion shaft 554. In this embodiment, pinion shaft 554 has a pinion head segment 556 formed integrally with tubular pinion shaft segment 552. As seen, a radially-inwardly extending rim flange 558 is formed on an inside diameter surface 560 of tubular shaft segment 552 in proximity to its end surface 562. Coupling component 550 includes a coupling flange segment 564 and an axially-extending tubular coupling shaft segment 566 defining a bore 570 having an inside diameter surface 568. In this non-limiting arrangement, a non-smooth, and preferably raised, surface profile, hereafter knurls 572, are formed on inner surface 568. Upon assembly of coupling component 550 to pinion shaft 554 prior to the upsetting process, the end of shaft segment 552 is installed in bore 570 with its outer surface 576 in press-fit engagement with knurls 572. Thereafter, the upsetting operation (similar to FIG. 12) is used to radially expand annular rim flange 558 and cause the deformed material to fixedly engage knurls 572.

FIGS. 14A and 14B illustrate use of the upsetting process previously disclosed for the purpose of securing a rotary drive component 580 to a tubular segment 582 of a shaft 584. In this embodiment, rotary drive component 580 can be either a gear or a sprocket, particularly of the type used in gear or sprocket drive systems. As seen, a radially-inwardly extending annular rim flange 586 extends from an inner diameter surface 588 of tubular segment 582 and is aligned with an outer diameter surface 590 thereof. Rotary drive component 580 includes a hub segment 592 and a drive segment 594. Hub segment 592 has an aperture 596 with an inside surface 598 formed to include a raised, non-smooth surface profile, hereinafter knurls 600. Upon assembly of hub segment 592 onto shaft segment 582, prior to the upsetting process, an interference fit engagement is established between knurls 600 and outer surface 590. Thereafter, the upsetting process causes rim flange 586 to be radially expanded and deformed into further engagement with knurls 600 on surface 598 of hub segment 592. This process provides a fixation interface between rotary drive component 580 and shaft 584 for torque transfer and axial retention.

In summary, the present disclosure is directed to various alternative embodiments of a stand-alone or pre-assembled PBC assembly. The coupling segment of each coupler shown in association with the PBC assemblies can mate with a suitable joint assembly or propshaft flange to facilitate a drive connection therebetween.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for fixedly securing a tubular shaft segment of a shaft to a rotary drive component for providing a two-piece assembly for use in a motor vehicle power transfer device, the method comprising the steps of:
providing the shaft segment of the shaft with an exterior surface and an interior surface having a radially inwardly extending annular rim;
providing the rotary drive component with a bore having an inner wall defining a non-smooth receiver surface;
axially aligning the exterior surface of the shaft segment with the bore of the rotary drive component;
establishing a press-fit engagement between the exterior surface of the shaft segment and the receiver surface by pressing the shaft segment of the shaft into the bore of the rotary drive component until the receiver surface is aligned with the annular rim; and
upsetting the annular rim until the annular rim is at least partially deformed radially outwardly with respect to the exterior surface of the shaft segment for engaging at least one of a groove and a projection formed on the receiver surface of the rotary drive component to fixedly secure the rotary drive component to the shaft.

2. The method of claim 1, wherein the shaft is a pinion shaft, wherein the shaft segment of the pinion shaft is a pinion shaft segment, wherein the rotary drive component is a coupler component, and wherein the two-piece assembly is a pinion shaft/coupler assembly.

3. The method of claim 2, wherein the pinion shaft/coupler assembly is adopted for use in at least one of a power take-off unit and a drive axle assembly.

4. The method of claim 1, wherein the rotary drive component is a gear, and wherein the two-piece assembly is a shaft/gear assembly.

5. The method of claim 1, wherein the rotary drive component is a sprocket, and wherein the two-piece assembly is a shaft/sprocket assembly.

6. The method of claim 1, wherein the step of upsetting the annular rim includes driving a mandrel through at least a portion of the tubular shaft segment to engage the annular rim and cause radial deformation of the annular rim.

7. The method of claim 1, wherein said step of establishing a press-fit engagement includes abutting the exterior surface of the shaft segment and the inner wall of the rotary drive component with a stop shoulder defined by at least one of the exterior surface of the shaft segment and the inner wall of the rotary drive component.

8. The method of claim 1, wherein said step of upsetting the annular rim includes deforming the annular rim into the projection, the projection extending radially inwardly and including at least one of splines and knurls.

9. A method of assembling a pinion-bearing-coupling (PBC) unit, the PBC unit facilitating the transfer of drive torque from a rotary input to a rotary output in a motor vehicle, the method comprising the steps of:
  providing a coupler including a coupler shaft having an outer surface defining a first cylindrical surface and an first inner race surface;
  providing a pinion unit having an outer surface defining a second inner race surface;
  providing a bearing unit including a lock collar and a bearing ring, the bearing ring having an inner surface defining a first outer race surface including at least one respective first roller and a second outer race surface including at least one respective second roller;
  mounting the pinion unit to the coupler shaft to establish a press-fit relationship;
  installing the bearing unit such that the at least one first roller engages the first inner race surface and the first outer race surface and the at least one second roller engages the second inner race surface and the second outer race surface; and
  displacing the lock collar for moving the bearing ring so as to adjust the preload applied to the at least one first roller and the at least one second roller.

10. The method of claim 9 including connecting a coupler flange segment extending radially outwardly from the coupler unit opposite of the press-fit pinion unit to a propshaft and pressing the lock collar into an axle housing.

11. The method of claim 9 wherein the PBC unit is adopted for use in at least one of a power take-off unit and a drive axle assembly.

12. The method of claim 9 wherein said step of providing at least one first roller and at least one second roller between the respective inner and outer race surfaces includes providing a plurality of first and second rollers having one of a generally spherical and oblong shape.

13. The method of claim 9 wherein said step of mounting the pinion unit to the coupler shaft to establish a press-fit relationship includes aligning an annular rim extending radially inwardly from an inner surface of the coupler shaft with a non-smooth receiver surface defined by an inner surface of the pinion unit and deforming the annular rim until it is at least partially deformed radially outwardly with respect to the exterior surface of the coupler shaft into fixed engagement with the receiver surface.

14. The method of claim 13 including a step of abutting the coupler shaft and the pinion unit with an annular step defined by at least one of the inner surface of the pinion unit and the outer surface of the tubular coupler shaft.

15. A method of assembling a torque transfer device for transferring drive torque from a coupler assembly having a shaft segment to a pinion shaft, the method comprising the steps of:
  providing the shaft segment wherein the shaft segment includes an exterior surface that is cylindrical, an interior surface defining an inner bore, and an annular rim extending radially inwardly from the interior surface;
  providing the pinion shaft wherein the pinion shaft includes an interior surface and an exterior surface, the interior surface defining a bore that is cylindrical and a receiver surface that is non-smooth;
  clamping the coupler assembly onto a base so that the inner bore of the shaft segment extends about an axis;
  placing the bore of the pinion shaft over the exterior surface of the shaft segment until the annular rim is axially aligned with the receiver surface;
  driving a ram into the inner bore of the shaft segment along the axis into the annular rim; and
  upsetting the annular rim with the ram until the annular rim is at least partially deformed radially outwardly into locking engagement with the receiver surface.

16. The method of claim 15, wherein the interior surface of the pinion shaft includes a radial stop surface and said step of and axially aligning the annular rim with the receiver surface further includes abutting the shaft segment against the radial stop surface.

17. The method of claim 15, wherein the receiver surface is at least partially recessed from the interior surface of the pinion shaft.

18. The method of claim 17, wherein the receiver surface includes a bottom surface recessed from the interior surface and a plurality of projections extending radially inwardly from the bottom surface.

19. The method of claim 18, wherein said step of upsetting the annular rim with the ram includes deforming the annular rim radially outwardly into the recessed receiver surface with a mandrel having a radially tapered head disposed on the ram.

* * * * *